(12) United States Patent
Zhou et al.

(10) Patent No.: US 11,531,340 B2
(45) Date of Patent: Dec. 20, 2022

(54) FLYING BODY, LIVING BODY DETECTION SYSTEM, LIVING BODY DETECTION METHOD, PROGRAM AND RECORDING MEDIUM

(71) Applicant: SZ DJI TECHNOLOGY CO., LTD., Shenzhen (CN)

(72) Inventors: Jiemin Zhou, Shenzhen (CN); Qingyu Lu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 422 days.

(21) Appl. No.: 16/726,618

(22) Filed: Dec. 24, 2019

(65) Prior Publication Data

US 2020/0150662 A1    May 14, 2020

Related U.S. Application Data

(63) Continuation of application No. PCT/CN2017/116603, filed on Dec. 15, 2017.

(30) Foreign Application Priority Data

Sep. 28, 2017  (JP) .............................. JP2017-188022

(51) Int. Cl.
| | |
|---|---|
| G05D 1/00 | (2006.01) |
| B64C 39/02 | (2006.01) |
| B64D 47/08 | (2006.01) |
| B64D 1/02 | (2006.01) |
| G05D 1/10 | (2006.01) |
| H04N 5/232 | (2006.01) |
| H04L 67/125 | (2022.01) |
| H04N 5/225 | (2006.01) |

(52) U.S. Cl.
CPC ......... G05D 1/0094 (2013.01); B64C 39/024 (2013.01); B64D 1/02 (2013.01);
(Continued)

(58) Field of Classification Search
CPC .... G05D 1/0094; G05D 1/0022; G05D 1/102; G05D 1/106; G05D 1/0038; G05D 1/00;
(Continued)

(56) References Cited

U.S. PATENT DOCUMENTS

2014/0032034 A1*  1/2014  Raptopoulos ...... H04B 7/18506
                                                              701/25
2016/0340006 A1* 11/2016  Tang .................... B64C 39/024
(Continued)

FOREIGN PATENT DOCUMENTS

CN         101914893 A       12/2010
CN         203444123 U        2/2014
(Continued)

OTHER PUBLICATIONS

The World Intellectual Property Organization (WIPO) International Search Report for PCT/CN2017/116603 dated Jun. 27, 2018 8 pages.

*Primary Examiner* — Yonel Beaulieu
(74) *Attorney, Agent, or Firm* — Anova Law Group, PLLC

(57) ABSTRACT

The present disclosure provides a flying body for detecting a living body. The flying body includes a sensor unit, that detects living body information related to the living body; a support component, that supports the sensor unit and is retractable; a gimbal, that rotatably supports the support component; a processing unit, that performs processing related to detection of the living body information; and a camera unit, that captures images. The processing unit makes the camera unit capture an image of an investigation area, controls the flight of the flying body such that the flying body approaches the investigation area, makes the support component extend to an investigation target located in the investigation area, and makes the sensor unit, which is supported by the gimbal supported by the extended support component, detect the living body information.

20 Claims, 34 Drawing Sheets

(52) U.S. Cl.
CPC ........... *B64D 47/08* (2013.01); *G05D 1/0022* (2013.01); *G05D 1/102* (2013.01); *G05D 1/106* (2019.05); *H04L 67/125* (2013.01); *H04N 5/23218* (2018.08); *B64C 2201/027* (2013.01); *B64C 2201/127* (2013.01); *H04N 5/2253* (2013.01)

(58) Field of Classification Search
CPC ........... B64C 39/024; B64C 2201/027; B64C 2201/127; B64C 39/02; B64D 1/02; B64D 47/08; H04L 67/125; H04N 5/23218; H04N 5/2253; H04N 5/2252; H04N 5/23293; H04N 5/2354; H04N 5/23206; H04N 5/2256; H04N 5/23296; G08G 5/00
See application file for complete search history.

(56) References Cited

U.S. PATENT DOCUMENTS

| | | | |
|---|---|---|---|
| 2017/0108609 A1 | 4/2017 | Haddy | |
| 2017/0148340 A1* | 5/2017 | Popa-Simil | G09B 9/48 |
| 2019/0057233 A1* | 2/2019 | Scott | G06V 10/10 |
| 2020/0182995 A1* | 6/2020 | Zeng | G01S 7/006 |

FOREIGN PATENT DOCUMENTS

| | | |
|---|---|---|
| CN | 104477399 A | 4/2015 |
| CN | 204433078 U | 7/2015 |
| CN | 106412525 A | 2/2017 |
| CN | 106741895 A | 5/2017 |
| CN | 206141848 U | 5/2017 |
| CN | 107089319 A | 8/2017 |
| CN | 107168358 A | 9/2017 |
| EP | 1903297 A2 | 3/2008 |
| JP | H04349095 A | 12/1992 |
| JP | H0871964 A | 3/1996 |
| JP | 2008150028 A | 7/2008 |
| JP | 2017074821 A | 4/2017 |
| JP | 2017077080 A | 4/2017 |
| JP | 2017136914 A | 8/2017 |
| KR | 101536574 B1 | 7/2015 |
| KR | 101715210 B1 | 3/2017 |
| WO | 2017041302 A1 | 3/2017 |
| WO | 2017147188 A1 | 8/2017 |

\* cited by examiner

FLYING BODY, LIVING BODY DETECTION SYSTEM, LIVING BODY DETECTION METHOD, PROGRAM AND RECORDING MEDIUM

CROSS-REFERENCE TO RELATED APPLICATION

This application is a continuation of International Application No. PCT/CN2017/116603, filed Dec. 15, 2017, which claims priority to JP Patent Application No. 2017-188022, filed Sep. 28, 2017, the entire content of all of which is incorporated herein by reference.

TECHNICAL FIELD

The present disclosure generally relates to a flying body for detecting a living body, a living body detection system, a living body detection method, a program, and a recording medium.

BACKGROUND TECHNOLOGY

In recent years, unmanned aerial vehicles (UAVs) have begun to be used for various applications. For example, UAVs have begun to be used for disaster investigations, and can be used for grasping disaster situations through aerial photography in disaster-stricken areas, searching for missing persons, etc.

In a disaster investigation, images may be taken in the air by a camera mounted on the UAV. However, the disaster investigation may sometimes be difficult based on the images alone. For example, when a person is buried inside the rubble, and the person buried inside the rubble cannot be seen from the outside of the rubble, it is very likely that the human body cannot be found. In addition, just by photographing the human body, it may not be able to fully know the situation of the human body, and thus the rescue efficiency may not be high. Further, UAVs are particularly expected to be used in areas with complex terrain and locations with secondary disaster risks.

SUMMARY OF DISCLOSURE

One aspect of the present disclosure provides a flying body for detecting a living body. The flying body includes a sensor unit, that detects living body information related to the living body; a support component, that supports the sensor unit and is retractable; a gimbal, that rotatably supports the support component; a processing unit, that performs processing related to detection of the living body information; and a camera unit, that captures images. The processing unit makes the camera unit capture an image of an investigation area, controls the flight of the flying body such that the flying body approaches the investigation area, makes the support component extend to an investigation target located in the investigation area, and makes the sensor unit, which is supported by the gimbal supported by the extended support component, detect the living body information.

Another aspect of the present disclosure provides a living body detection method of a flying body. The flying body includes a sensor unit for detecting living body information related to a living body, a support component that supports the sensor unit and is retractable, and a gimbal for rotatably supporting the support component, and detecting the living body. The method includes making a camera unit capture an image of an investigation area; controlling the flight of the flying body such that the flying body approaches the investigation area; making the support component extend to an investigation target located in the investigation area; and making the sensor unit, which is supported by the gimbal supported by the extended support component, detect the living body information.

Other aspects of the present disclosure can be understood by those skilled in the art in light of the description, the claims, and the drawings of the present disclosure.

BRIEF DESCRIPTION OF THE DRAWINGS

In order to more clearly illustrate the technical solutions in the embodiments of the present disclosure, the drawings that need to be used in the description of the embodiments will be briefly described below. It is obvious that the drawings in the following description are some embodiments of the present disclosure, and for those of ordinary skill in the art, other drawings may also be obtained according to these drawings without any creative effort.

DETAILED DESCRIPTION OF THE EMBODIMENTS

Figure 1A:
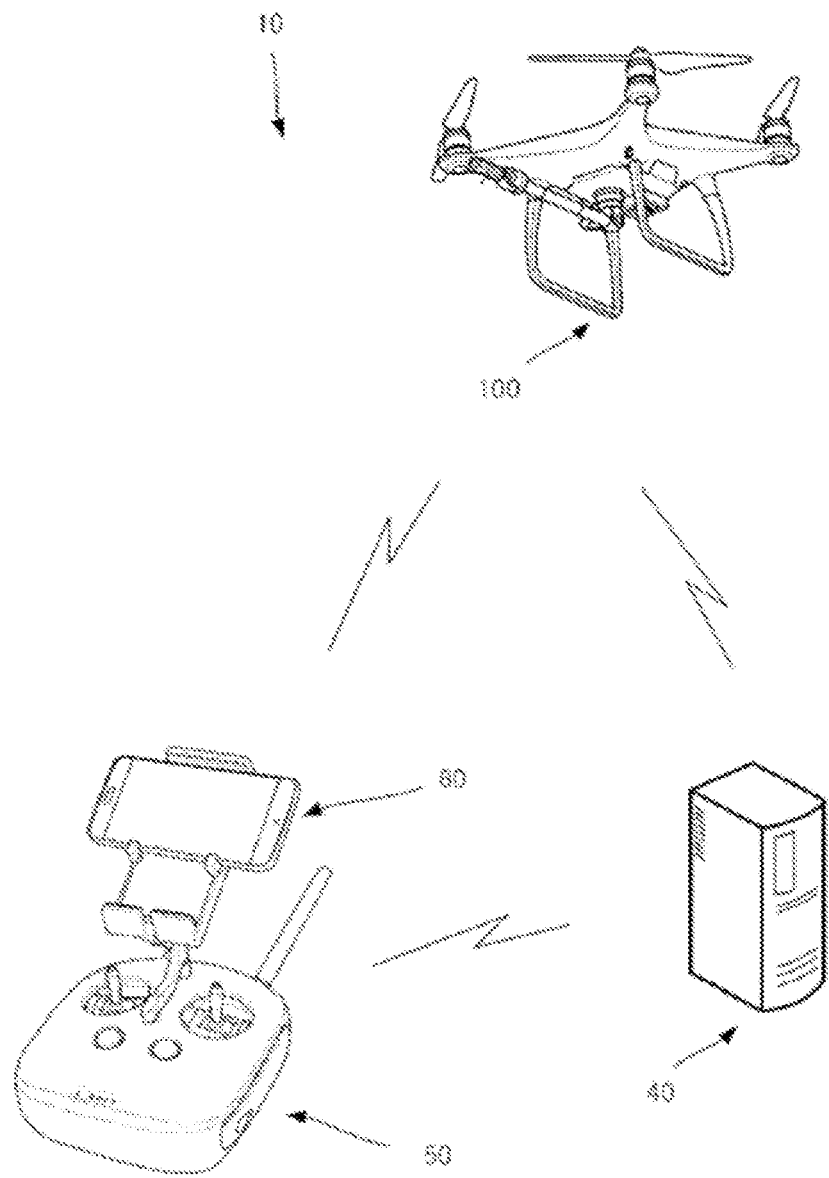
FIG. 1A illustrates a schematic diagram of a configuration example of a living body detection system according to an embodiment of the present disclosure.

In the following, the present invention will be described with embodiments of the present disclosure, but the following embodiments are not intended to limit the invention according to the claims. Not all the combinations of features described in the embodiments are necessary for the solutions of the present disclosure.

In following embodiments, an unmanned aerial vehicle (UAV) is mainly used as an example of a flying body. In the drawings of the present specification, the unmanned aerial vehicle is also marked as "UAV". A living body detection method may prescribe actions of the UAV. A program (for example, a program for controlling a UAV to perform various processes) is recorded in the recording medium.

FIG. 1A illustrates a schematic diagram of a configuration example of a living body detection system 10 according to an embodiment of the present disclosure. The living body detection system 10 may include a UAV 100, a sender 50, a terminal 80, and a server device 40. The UAV 100, the sender 50, the terminal 80, and the server device 40 may communicate with each other through wired communication or wireless communication (for example, a wireless local area network (LAN)). In FIG. 1A, a portable terminal (for example, a smart phone or a tablet terminal) is taken as an example of the terminal 80. The sender 50 is an example of a controller. The terminal 80 is an example of a controller.

Figure 1B:
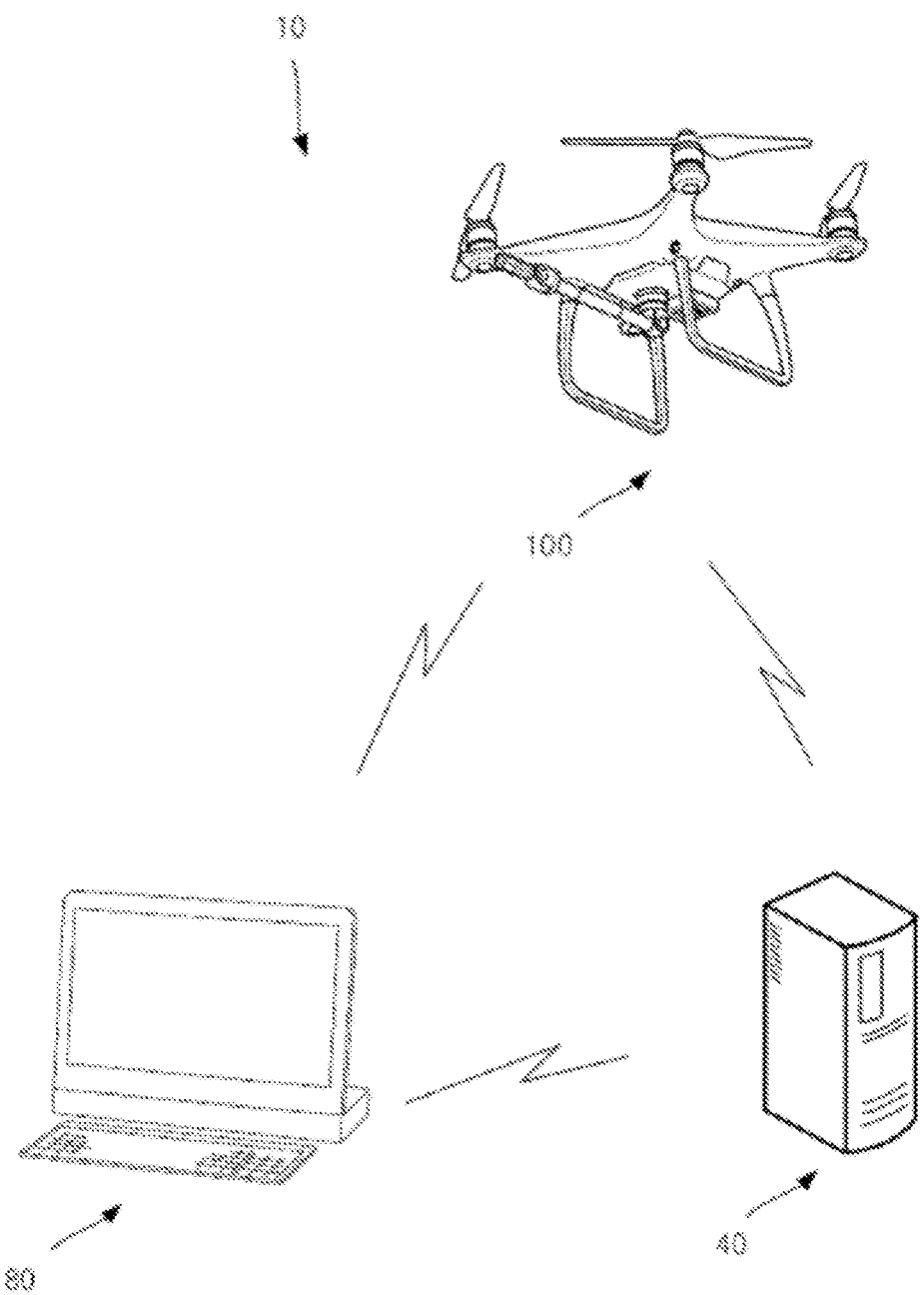
FIG. 1B illustrates a schematic diagram of another configuration example of a living body detection system.

FIG. 1B illustrates a schematic diagram of another configuration example of a living body detection system 10 according to an embodiment of the present disclosure. In FIG. 1B, a personal computer (PC) is taken as an example of the terminal 80. In either FIG. 1A or FIG. 1B, the terminal 80 may have the same function.

Figure 2:
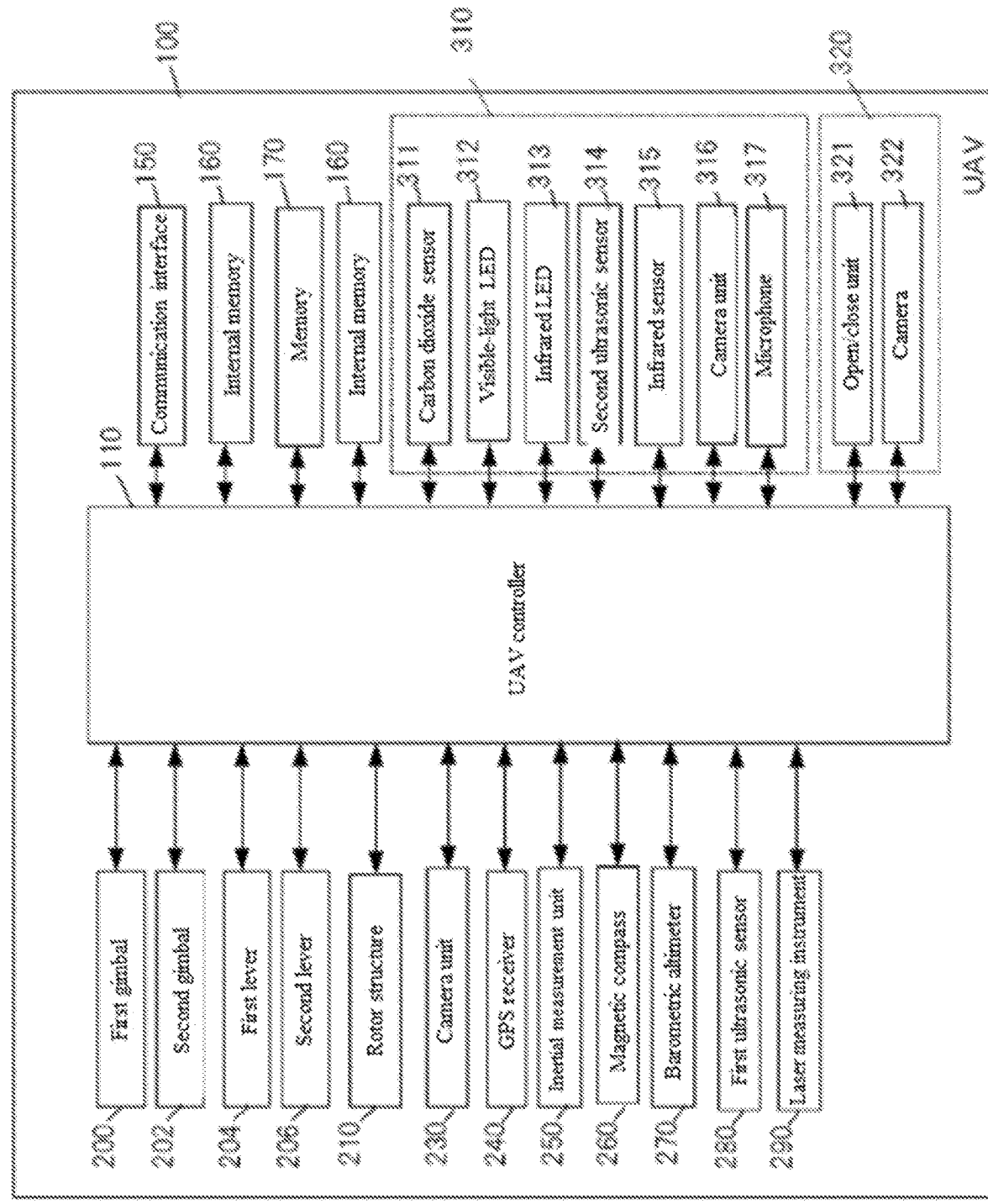
FIG. 2 illustrates a block diagram of an example of a hardware configuration of an unmanned aerial vehicle (UAV)

FIG. 2 illustrates a block diagram of an example of a hardware configuration of a UAV 100. The UAV 100 may include a UAV controller 110, a communication interface 150, an internal memory 160, a memory 170, a first gimbal 200, a second gimbal 202, a first lever 204, a second lever 206, and a rotor mechanism 210, a camera unit 230, a GPS receiver 240, an inertial measurement unit (IMU) 250, a magnetic compass 260, a barometric altimeter 270, a first ultrasonic sensor 280, a laser measuring instrument 290, a sensor unit 310, and a receiving container 320.

The sensor unit 310 may include a plurality of sensors. The sensor unit may include, for example, a carbon dioxide ($CO_2$) sensor 311, a visible-light light emitting diode (LED) 312, an infrared LED 313, a second ultrasonic sensor (314), an infrared sensor 315, a camera unit 316, and a microphone 317. Moreover, some of these components on the sensor unit 310 may be omitted. The receiving container 320 may include an open/close unit 321 and a camera 322.

The UAV controller 110 may be an example of a processing unit. The first gimbal 200 may be an example of a gimbal. The first lever 204 may be an example of a first support component. The second lever 206 may be an example of a second support component or an example of any support component.

The UAV controller 110 may include, for example, a central processing unit (CPU), an MPU (Micro Processing Unit), or a DSP (Digital Signal Processor). The UAV controller 110 may perform signal processing for overall control of the actions of various parts of the UAV 100, data input/output processing with other parts, data calculation processing, and data storage processing.

The UAV controller 110 may control the flight of the UAV 100 according to a program stored in the internal memory 160. The UAV controller 110 may control the flight of the UAV 100 according to an aerial photography path generated by the UAV controller 110 and also according to a program stored in the internal memory 160. The UAV controller 110 may control the flight of the UAV 100 according to an instruction received from a remote sender 50 through the communication interface 150. The instructions received by the sender 50 may include, for example, instructions for moving forward/backward, up/down, and left/right, and also instructions for rotating, rising, and processing obtained through the operation of the sender 50 by an operator.

The UAV controller 110 may acquire position information indicating the position of the UAV 100. The UAV controller 110 may acquire position information indicating the latitude, longitude, and altitude of the UAV 100 from the GPS receiver 240. The UAV controller 110 may acquire the latitude and longitude information indicating the latitude and longitude where the UAV 100 is located from the GPS receiver 240 and the altitude information indicating the altitude where the UAV 100 is located from the barometric altimeter 270 as position information. The UAV controller 110 may acquire the distance between the emission point of the ultrasonic wave and the reflection point of the ultrasonic wave measured by the first ultrasonic sensor 280 as the height information.

The UAV controller 110 may acquire orientation information indicating the orientation of the UAV 100 from the magnetic compass 260. The orientation information may be represented by, for example, an orientation corresponding to the orientation of the nose of the UAV 100.

The UAV controller 110 may acquire position information indicating a position where the UAV 100 should exist when the camera unit 316 takes images in an imaging range where images should be taken. The UAV controller 110 may acquire position information indicating a position where the UAV 100 should exist from the internal memory 160. The UAV controller 110 may acquire position information indicating a position where the UAV 100 should exist from another device through the communication interface 150. The UAV controller 110 may refer to a map database (a three-dimensional map database or a two-dimensional map database) to identify a position where the UAV 100 can exist, and acquire this position as position information indicating a position where the UAV 100 should exist.

The UAV controller 110 may acquire imaging range information indicating the imaging ranges of the camera unit 316 and the camera unit 230. The UAV controller 110 may acquire viewing-angle information indicating the viewing angles of the camera unit 316 and the camera unit 230 from the camera unit 316 and the camera unit 230 as parameters for determining the imaging range. The UAV controller 110 may acquire information indicating the imaging directions of the camera unit 316 and the camera unit 230 as parameters for determining an imaging range. The UAV controller 110 may acquire posture information indicating the posture state of the camera unit 316 from the first gimbal 200 and the second gimbal 202 as, for example, information indicating the imaging direction of the camera unit 316. The posture information of the camera unit 316 may be information combining (such as merging, summing) an angle where the first gimbal 200 is rotated from the reference rotation angles of the roll axis, the pitch axis, and the yaw axis, and an angle where the second gimbal 202 is rotated from the reference rotation angles of the roll axis, the pitch axis, and the yaw axis.

The UAV controller 110 may acquire position information indicating a position where the UAV 100 is located as a parameter for determining an imaging range. The UAV controller 110 may determine an imaging range indicating the geographic range where the camera unit 316 takes images and generate imaging range information based on the viewing angles and imaging directions of the camera unit 316 and the camera unit 230 and the position of the UAV 100, thereby obtaining the imaging range information. The UAV controller 110 may acquire imaging range information from the internal memory 160. The UAV controller 110 may acquire imaging range information through the communication interface 150.

The UAV controller 110 may control the first gimbal 200, the second gimbal 202, the first lever 204, the second lever 206, the rotor mechanism 210, the camera unit 230, the sensor unit 310 that includes the camera unit 316, and the receiving container 320. The UAV controller 110 may control the imaging range of the camera unit 316 by changing the imaging direction or viewing angle of the camera unit 316. The UAV controller 110 may control the imaging range of the camera unit 316 supported by the second gimbal 202 by controlling a rotation mechanism of at least one of the first gimbal 200 and the second gimbal 202.

The imaging range may refer to a geographic range in which the camera unit 316 or the camera unit 230 takes images. The imaging range may be defined by latitude, longitude, and altitude. The imaging range may be a range of three-dimensional space data defined by latitude, longitude, and height. The imaging range may be a range of two-dimensional space data defined by latitude and longitude. The imaging range may be determined based on the viewing angles and imaging directions of the camera unit 316 or the camera unit 230 and the position where the UAV 100 is located. The imaging directions of the camera unit 316 and the camera unit 230 can be defined by the azimuth and depression angles of the front side of the imaging lenses disposed in the camera unit 316 and the camera unit 230. The imaging direction of the camera unit 316 may be a direction determined by the orientation of the nose of the UAV 100 and the posture state of the camera unit 316. The imaging direction of the camera unit 230 may be a direction determined by the orientation of the nose of the UAV 100 and the position where the camera unit 230 is installed.

The UAV controller 110 may recognize the environment around the UAV 100 by analyzing a plurality of images captured by a plurality of camera units 230. The UAV controller 110 may control the flight according to the environment around the UAV 100, for example, to avoid obstacles.

The UAV controller 110 may acquire stereoscopic information (three-dimensional information) indicating a stereoscopic shape (three-dimensional shape) of an object existing around the UAV 100. Objects may be obstacles such as buildings, roads, cars, trees, rubble, etc. The stereoscopic information may be, for example, three-dimensional space data. The UAV controller 110 may generate stereoscopic information representing a stereoscopic shape of an object existing around the UAV 100 based on the images obtained from the plurality of camera units 230, thereby obtaining the stereoscopic information. The UAV controller 110 may obtain stereoscopic information indicating a stereoscopic shape of an object existing around the UAV 100 by referring to a three-dimensional map database stored in the internal memory 160 or the memory 170. The UAV controller 110 may obtain stereoscopic information related to the stereoscopic shape of an object existing around the UAV 100 by referring to an online three-dimensional map database managed by a server.

The UAV controller 110 may control the flight of the UAV 100 by controlling the rotor mechanism 210. That is, the UAV controller 110 may control the position of the UAV 100 including the latitude, longitude, and altitude by controlling the rotor mechanism 210. The UAV controller 110 may control the imaging range of the camera unit 316 by controlling the flight of the UAV 100. The UAV controller 110 may control the viewing angle of the camera unit 316 by controlling a zoom lens included in the camera unit 316. The UAV controller 110 may use the digital zoom function of the camera unit 316 to control the viewing angle of the camera unit 316 through digital zoom.

The communication interface 150 may communicate with, for example, the sender 50, the terminal 80, and the server device 40. The communication interface 150 may perform wireless communication in any wireless communication method. The communication interface 150 may perform wired communication using any wired communication method. The communication interface 150 may send an aerial photography image and the additional information related to the aerial photography image to the terminal 80 and the server device 40. The aerial photography image may be a moving image or a static image. The communication interface 150 may send detection information (for example, living body information related to a living body) detected by the sensor unit 310 to the terminal 80 and the server device 40.

The internal memory 160 may store programs and the like that are necessary for the UAV controller 110 to control the first gimbal 200, the second gimbal 202, the first lever 204, the second lever 206, the rotor mechanism 210, the camera unit 230, the GPS receiver 240, the IMU 250, the magnetic compass 260, a barometric altimeter 270, a first ultrasonic sensor 280, a laser measuring instrument 290, the sensor unit 310, the receiving container 320. The internal memory 160 may be a computer-readable recording medium, and may include at least one of a static random access memory (SRAM), a dynamic random access memory (DRAM), an erasable programmable read-only memory (EPROM), an electrically erasable programmable read-only memory (EEPROM), or a flash memory such as a universal serial bus (USB) memory, etc. The internal memory 160 may also be detached from a UAV fuselage 102 (referring to FIG. 3) of the UAV 100.

The memory 170 may include at least one of a hard disk drive (HDD), a solid state drive (SSD), a secure digital (SD) card, a USB memory, or other memories. The memory 170 may store various information and various data. The memory 170 may also be detached from the UAV fuselage 102 of the UAV 100. The memory 170 may record, for example, aerial photography images, additional information related to aerial photography images, and living body information detected by the sensor unit 310.

The rotor mechanism 210 may include a plurality of rotors 211 and a plurality of drive motors that rotate the plurality of rotors 211. The rotor mechanism 210 may control the rotation by the UAV controller 110 to fly the UAV 100. The number of the rotors 211 may be, for example, four or other numbers. In addition, the UAV 100 may be a fixed-wing aircraft without any rotor.

The camera unit 316 may be an imaging camera (main camera) that takes images of objects included in a desired imaging range (for example, the sky situation, the scenes such as mountains, rivers, etc., and the ground buildings at the aerial photography target). The camera unit 316 may take images of an object in a desired imaging range and generates data of the captured images. The image data (for example, aerial photography images) obtained through the camera unit 316 taking images may be stored in an internal memory included in the camera unit 316 or in the memory 170. The three-dimensional space data (three-dimensional shape data) around the UAV 100 may be generated based on the images that are repeatedly captured on a part of the imaging range at a plurality of locations by the camera unit 316.

The camera unit 230 may be a sensor camera (sub-camera) for imaging the surroundings of the UAV 100 in order to control the flight of the UAV 100. The two camera units 230 may be provided on the front of the nose of the UAV 100. In addition, another two camera units 230 may be disposed on the bottom side of the UAV 100. The two camera units 230 on the front side may be paired to function as a so-called stereo camera. The two camera units 230 on the bottom side may also be paired to function as a stereo camera. The three-dimensional space data (three-dimensional shape data) around the UAV 100 can be generated from the images captured by the plurality of camera units 230. The number of camera units 230 included in the UAV 100 is not limited to four. The UAV 100 may include at least one camera unit 230. The UAV 100 may be provided with at least one camera unit 230 on the nose, tail, side, bottom, and top of the UAV 100, respectively. The viewing angle that can be set for the camera unit 230 may be larger than the viewing angle that can be set for the camera unit 316. The camera unit 230 may include a fixed focus lens or a fisheye lens. The camera unit 230 may image the surroundings of the UAV 100 and generate data of the captured images. The image data of the camera unit 230 may be stored in the memory 170.

The GPS receiver 240 may receive a plurality of signals indicating the time sent from a plurality of navigation satellites (e.g., GPS satellites) and the position (coordinates) of each GPS satellite. The GPS receiver 240 may calculate the position of the GPS receiver 240 (that is, the position of the UAV 100) according to the plurality of received signals. The GPS receiver 240 may output the position information of the UAV 100 to the UAV controller 110. In addition, the UAV controller 110 may be used to replace the GPS receiver 240 for calculating the position information of the GPS receiver 240. In this case, the information indicating the time and the position of each GPS satellite included in the plurality of signals received by the GPS receiver 240 may be inputted into the UAV controller 110.

The IMU 250 may detect the attitude of the UAV 100 and output the detection result to the UAV controller 110. The IMU 250 may detect the acceleration of the UAV 100 in the three-axis directions of the forward/backward, left/right, and up/down directions and the angular velocity of the UAV 100 in three-axis directions of the pitch axis, the roll axis, and the yaw axis, as the attitude of the UAV 100.

The magnetic compass 260 may detect the head orientation of the UAV 100 and output the detection result to the UAV controller 110.

The barometric altimeter 270 may detect the flying height of the UAV 100 and output the detection result to the UAV controller 110.

The first ultrasonic sensor 280 may transmit ultrasonic waves, detect ultrasonic waves reflected from the ground and objects, and output a detection result to the UAV controller 110. The detection result may indicate the distance from the UAV 100 to the ground, that is, the altitude. The detection result may indicate a distance from the UAV 100 to an object (for example, a living body, or an obstacle).

The laser measuring instrument 290 may illuminate an object with laser, receive the reflected light reflected by the object, and measure the distance between the UAV 100 and the object through the reflected light. As an example of a distance measurement method using laser, a time-of-flight method may be used.

Figure 3:
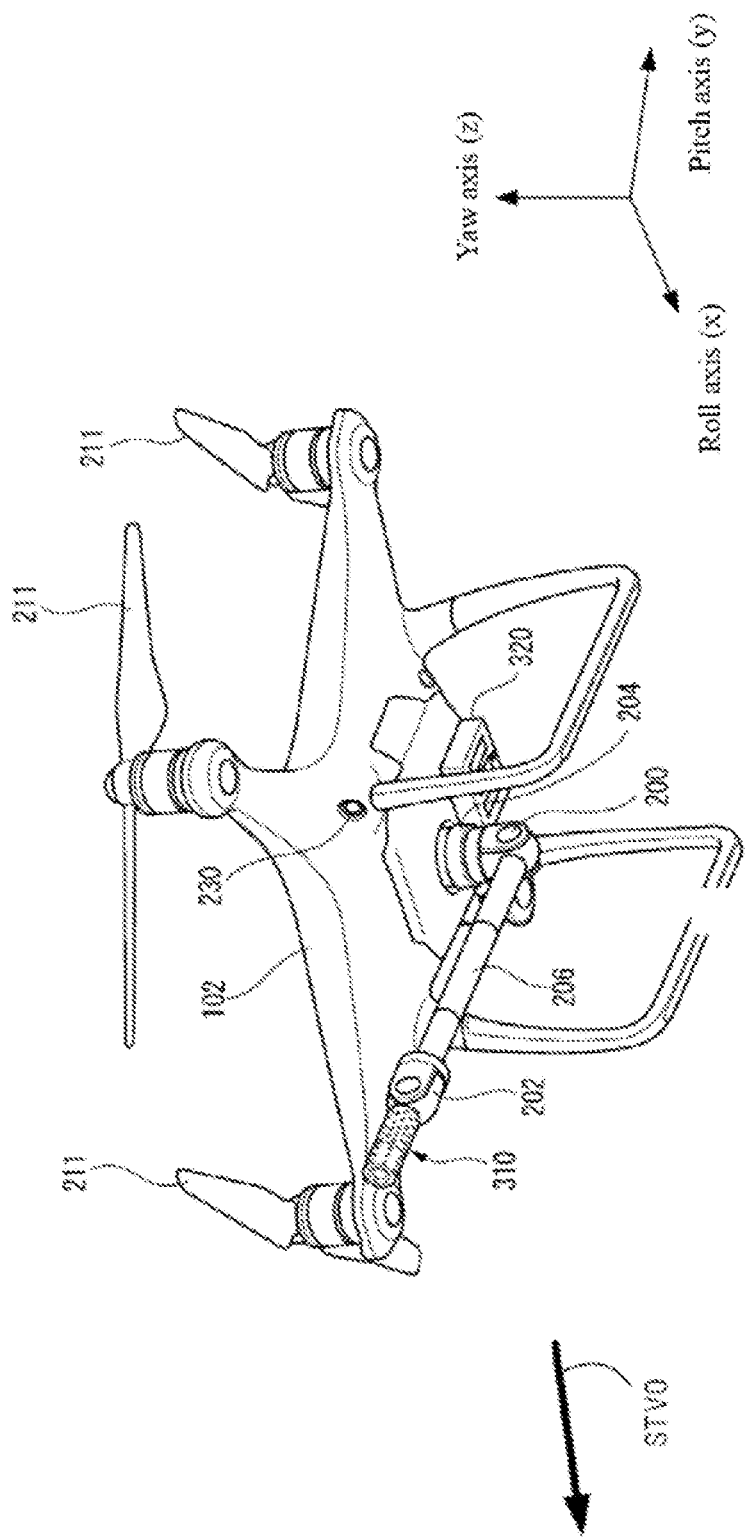
FIG. 3 illustrates an external view of an example of a UAV.

FIG. 3 illustrates an external view of an example of the UAV 100.

The first gimbal 200 may rotatably support the second lever 206 around a yaw axis, a pitch axis, and a roll axis. The first gimbal 200 may change the orientation of the second lever 206 by rotating the second lever 206 around at least one of the yaw axis, the pitch axis, or the roll axis.

The yaw axis, the pitch axis, and the roll axis may be determined as follows. For example, the roll axis may be defined as a horizontal direction (a direction parallel to the ground). In this case, the pitch axis may be determined to be a direction parallel to the ground and perpendicular to the roll axis, and the yaw axis (refer to the z axis) may be determined to be the direction perpendicular to the ground and perpendicular to the roll axis and pitch axis.

The second gimbal 202 may rotatably support the sensor unit 310 around a yaw axis, a pitch axis, and a roll axis. The second gimbal 202 may change the orientation of the sensor unit 310 by rotating the sensor unit 310 around at least one of the yaw axis, the pitch axis, or the roll axis.

The rotor 211 of the rotor mechanism 210, the camera unit 230, the first lever 204, the receiving container 320, etc., may be mounted on the UAV fuselage 102. The UAV fuselage 102 is an example of a fuselage.

The first lever 204 may be arranged along the yaw axis (z). The first lever 204 is retractable. The first lever 204 may be extended or retracted under the control of the UAV controller 110, such that the length may be changed. The first lever 204 may be normally in an unstretched state. The length of the first lever 204 when it is extended may be, for example, 1 m or less.

The first gimbal 200 may be connected to and supported by the first lever 204. The first gimbal 200 may, under the control of the UAV controller 110, adjust the angle of the second lever 206, that is, the extension direction of the second lever 206 (the orientation of the second lever 206).

The second lever 206 may be connected to and supported by the first gimbal 200. The angle of the second lever 206 may be adjusted by the first gimbal 200, that is, the extension direction of the second lever 206 may be adjusted. The second lever 206 may be retractable. The second lever 206 may be extended and retracted under the control of the UAV controller 110, such that the length may be changed. The second lever 206 may be normally in an unstretched state. The length of the second lever 206 when it is extended may be, for example, 1 m to 2 m. The second lever 206 may be normally extended along a reference direction (in FIG. 3, the direction along the roll axis (x)). This reference direction may be a direction along a horizontal direction (such as the roll axis (x) or the pitch axis (y)).

The second gimbal 202 may be connected to and supported by the second lever 206. The second gimbal 202 may adjust the angle (orientation) of the sensor unit 310 that is mounted closer to the front end than the second gimbal 202.

As such, the UAV 100 having two levers (the first lever 200 and the second lever 202) may be able to finely adjust the position of the sensor unit 310 disposed at the front end. For example, by adjusting the angle of the second lever 206 with respect to the first gimbal 200, even when there are obstacles around the investigation target, the UAV 100 may be able to extend the second lever 206 through the gap of the obstacles, and make the sensor unit 310 enter the gap of the obstacles. For example, by adjusting the angle of the sensor unit 310 with respect to the second gimbal 202, even when a living body as an investigation target does not move, the UAV 100 may be able to flexibly adjust the orientation of the sensor unit 310 in the space inside the gap of the obstacles, and thus may still possibly detect (measure) information related to the living body (living body information) from a desired direction. Therefore, even in a case where there are many obstacles and a living body cannot move, the UAV 100 may still be able to increase the possibility to appropriately detect living body information.

In addition, when the second gimbal 202 is retractable, the UAV 100 may be able to extend the second lever 206 into the gap of the obstacles, and may help the sensor unit 310 located closer to the front end than the second lever 206 approach the living body which is an investigation target.

In addition, when the first gimbal 200 is free to extend and contract, the UAV 100 may be able to reduce the height where the sensor unit 310 is located by extending the first gimbal 200 even when, for example, there are many obstacles, or the flight environment is severe for descending. Therefore, the degree of freedom in adjusting the positions of the second lever 206 and the sensor unit 310 in the gravity direction is increased, and the UAV 100 may be able to easily detect living body in response to various disaster situations.

Figure 4:
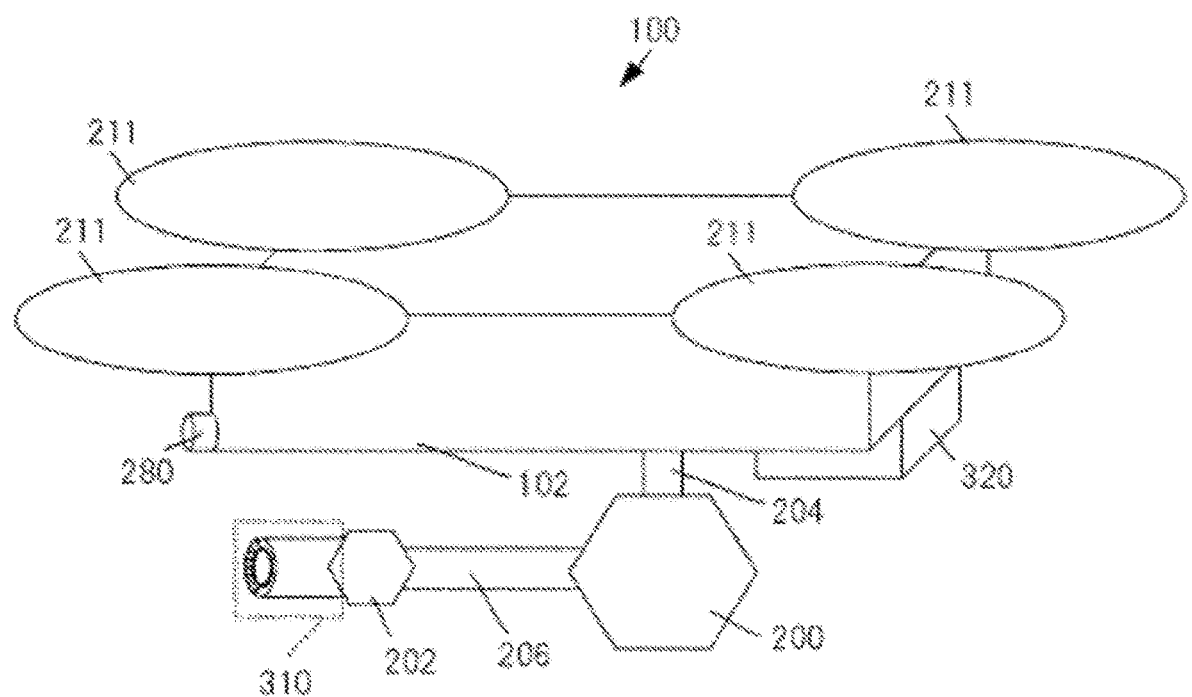
FIG. 4 illustrates a schematic view of a configuration example of a UAV in a state where a second lever is not extended.
Figure 5:
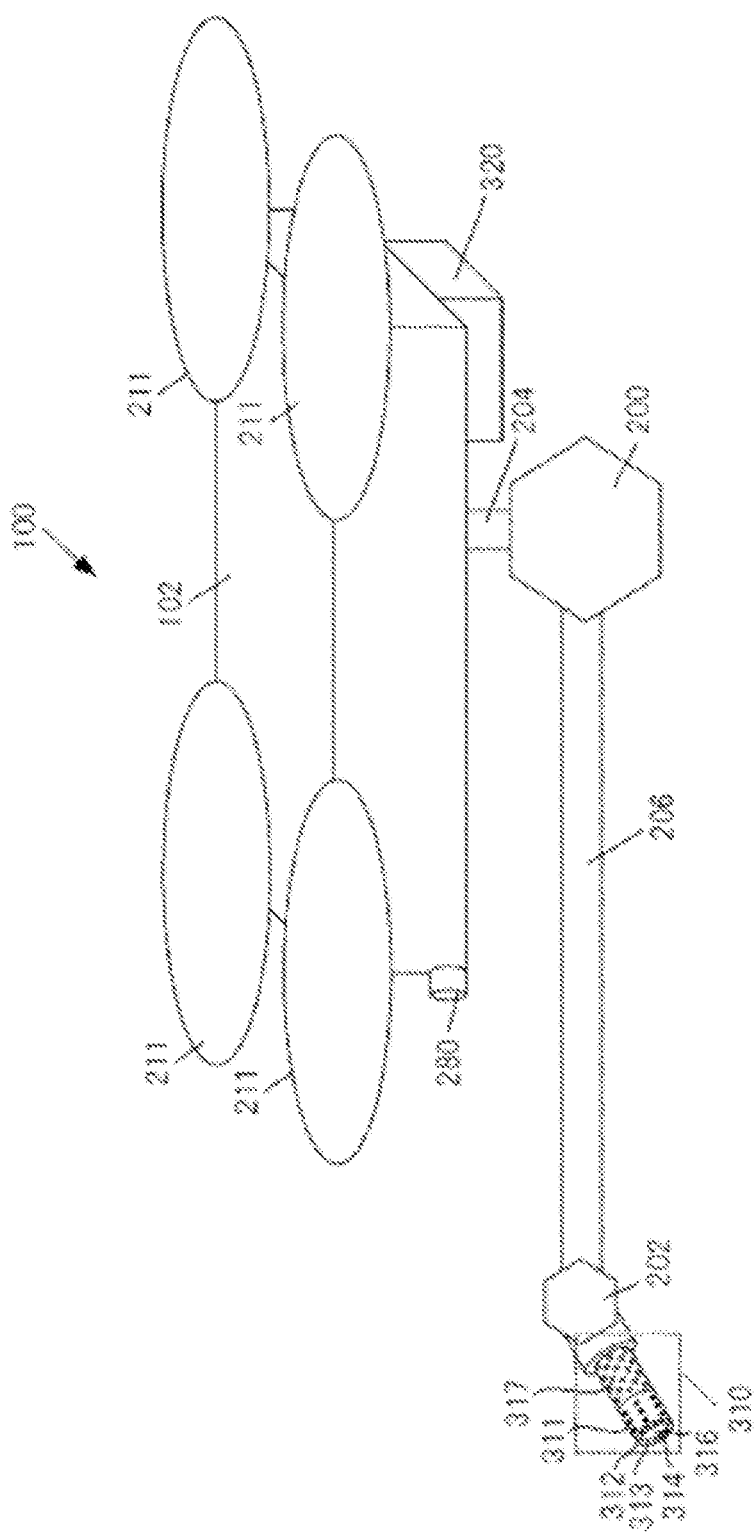
FIG. 5 illustrates a schematic view of a configuration example of a UAV in a state where a second lever is extended.
Figure 6:
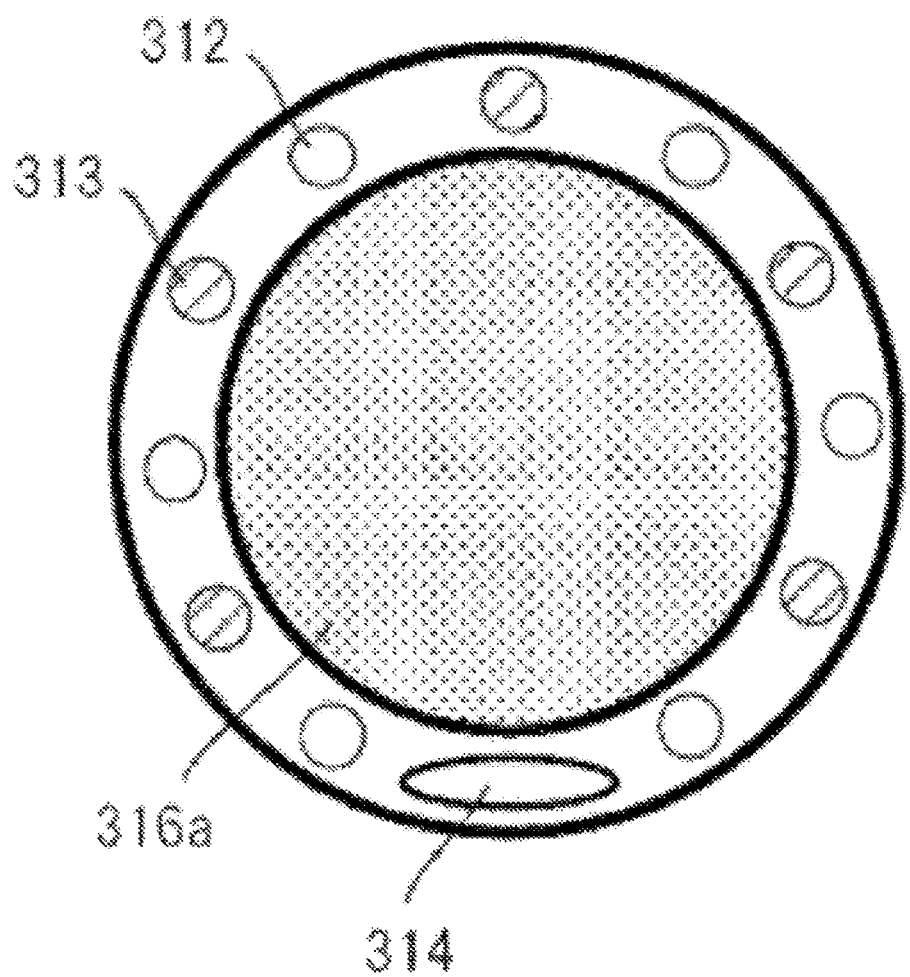
FIG. 6 illustrates a schematic diagram of a sensor unit viewed from a front-end side.

FIG. 4 illustrates a schematic view of a configuration example of a UAV 100 in a state where a second lever 206 is not extended. FIG. 5 illustrates a schematic view of a configuration example of a UAV 100 in a state where a second lever 206 is extended. FIG. 6 illustrates a schematic diagram of a sensor unit 310 viewed from a front-end side. In FIG. 6, the sensor unit 310 may be viewed from a viewpoint facing the image sensor 316a of the sensor unit 310.

The carbon dioxide sensor 311 may measure the concentration of the carbon dioxide ($CO_2$) gas around the carbon dioxide sensor 311. The visible-light LED 312 may emit visible light (for example, white light) having a wavelength in a visible light region. The infrared LED 313 may emit infrared light having a wavelength in an infrared light region. The visible light and the infrared light may be emitted to the investigation target, and the investigation target may be illuminated.

The second ultrasonic sensor 314 may transmit ultrasonic waves, detect ultrasonic waves reflected from the ground and objects, and output a detection result to the UAV controller 110. The detection result may indicate a distance from the second ultrasonic sensor 314 to an object (for example, a living body, or an obstacle).

The camera unit 316 may include an image sensor 316a and may capture an image. The image sensor 316a may be sensitive to visible light. The image sensor 316a may be sensitive to infrared light. Under the control of the UAV controller 110, the camera unit 316 may be able to take images of an object during the period when the visible-light LED 312 emits visible light to illuminate the object. The camera unit 316 may be controlled by the UAV controller 110 to take images of an object during the period when the infrared LED 313 emits infrared light to illuminate the object.

The microphone 317 may receive sound generated around the microphone 317.

In FIG. 6, the image sensor 316a may be disposed in the center of the sensor unit 310, and the visible-light LED 312 and the infrared LED 313 may be disposed around the image sensor 316a. The image sensor 316a may be formed in a substantially circular shape, or may be formed in another shape (for example, a rectangle). The visible-light LED 312 and the infrared LED 313 may be formed in a substantially circular shape around the image sensor 316a, or may be formed in other shapes (for example, a rectangle). The visible-light LED 312 and the infrared LED 313 may be provided in plurality, and the plurality of visible-light LEDs 312 and the plurality of infrared LEDs 313 may be alternately arranged. Alternatively, the plurality of visible-light LEDs 312 and the plurality of infrared LEDs 313 may not be arranged alternately.

As shown in FIG. 4, when the second lever 206 is in an unstretched state without being stretched, a portion of the second lever 206 protruding from the UAV fuselage 102 in the horizontal direction may become shorter, or the second lever 206 may not protrude from the UAV fuselage 102. Therefore, the need for the UAV 100 to pay attention to the collision of the second lever 206 with other objects and the like during flight may be reduced, which facilitates safe flight.

As shown in FIG. 5, when the second lever 206 is in an extended state, the portion of the second lever 206 protruding from the UAV fuselage 102 in the horizontal direction may become longer. Therefore, the UAV 100 may be able to increase the distance from the sensor unit 310 located on the front end side of the extended second lever 206 to the UAV fuselage 102 and the rotor 211. In this case, even in a space surrounded by rubble, etc., the UAV 100 may still be able to easily perform various measurements using the sensor unit 310.

In addition, the various sensors included in the sensor unit 310 may not need to operate all at the same time, and may be partially turned off and partially turned on. For example, when data of an investigation target buried in an obstacle (such as rubble) is to be detected, an image may be captured by the camera unit 316 first, and this image may be displayed on the display unit 88 of the terminal 80. That is, the user can visually confirm whether or not a living body such as a person is present in the image. When the amount of light in the obtained image is insufficient, the visible-light LED 312 may be used to illuminate the investigation target and capture a visible image. In addition, the infrared LED 313 can be used to illuminate the investigation target and capture an infrared image. When the image cannot be fully confirmed, the sensor unit 310 may turn on the microphone 317 to receive sound data, or the carbon dioxide sensor 311 may detect the amount of carbon dioxide. When the power of each sensor is turned on in sequence, the UAV 100 may be able to achieve power saving. In addition, all the sensors of the sensor unit 310 may be turned on and operated simultaneously. In this case, the UAV 100 may be able to acquire data (living body information) of the investigation target in a short time.

In addition, in FIGS. 4 and 5, the first ultrasonic sensor 280 may be installed in front of the UAV fuselage 102. The first ultrasonic sensor 280 may detect the distance from the front end of the UAV fuselage 102 (that is, the front end of the UAV 100, the front end of the forward rotor 211 included in the UAV 100) to an object (such as an obstacle around the investigation target).

Figure 7:
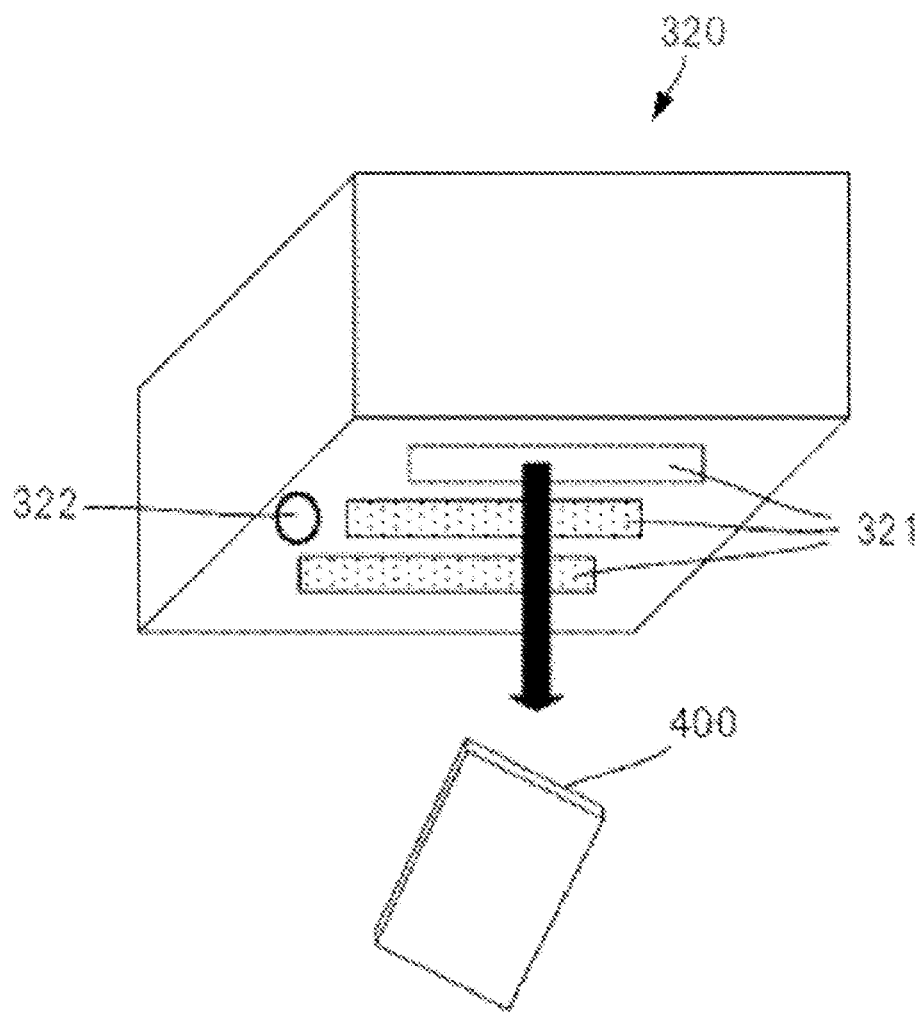
FIG. 7 illustrates a schematic perspective view of a configuration example of a receiving container.

FIG. 7 illustrates a schematic perspective view of a configuration example of a receiving container 320.

The receiving container 320 may carry and store more than one transmitter 400 (for example, a small transmitter). The receiving container 320 may include one or more open/close units 321 (for example, open/close doors) and a camera 322.

The open/close unit 321 may be normally closed. The open/close unit 321 may be opened, for example, under the control of the UAV controller 110. For example, when the position information acquired by the GPS receiver 240 indicates a predetermined position, the UAV controller 110 may open the open/close unit 321. The UAV controller 110 may open the open/close unit 321 based on the operation information (opening instruction information) of an operation unit 83 of the terminal 80 acquired through the communication interface 150. When the open/close unit 321 is opened, the transmitter 400 contained in the receiving container 320 may pass through the open/close unit 321 and may be dropped. The UAV 100 may be able to mark the position where the transmitter is dropped by dropping the transmitter 400. For example, the user may easily find living bodies existing around the dropping position of the transmitter 400 by capturing the radio waves of the transmitter 400. In addition, the user may be a person who detects living bodies (such as rescue personnel who perform living body detection and rescue at the scene of a disaster or an accident), a person who supports the detection of living bodies (such as a person waiting at a center and cooperating with the rescue personnel), etc.

The camera 322 may be disposed, for example, at a lower portion of the receiving container 320 and capture an image of the lower portion of the receiving container 320. The camera 322 may be used to, for example, confirm the dropping position of the transmitter 400 when the transmitter 400 is dropped from the receiving container 320. By capturing images with the camera 322, the UAV 100 may be able to prevent the dropped transmitter 400 from falling on a living body. The image captured by the camera 322 may be sent to the terminal 80 and displayed.

The transmitter 400 may emit radio waves. The transmitted radio waves may be received, for example, by the terminal 80 held by the user. In this case, the user may be able to determine whether the transmitter 400 exists, that is, whether a living body exists, by confirming the reception of the radio waves from the transmitter 400 by the terminal 80 held by the user. Therefore, the transmitter 400 may support the user's disaster relief.

The transmitter 400 may send a signal including its own identification information for identifying itself. When there are multiple transmitters 400, the identification information of the transmitters 400 may be different. Therefore, even when a plurality of transmitters 400 are dropped from the receiving container 320, it is possible to identify which transmitter 400 is emitting a signal based on the identification information included in the signal received by the terminal 80.

The transmitter 400 may include a battery for supplying power to various parts of the transmitter 400. The battery may have a capacity such that the transmitter 400 can operate for at least 48 hours. As a result, the transmitter 400 may be able to continuously transmit radio waves for more than 48 continuous hours, which facilitates to finding survivors near the transmitter 400.

Figure 8:
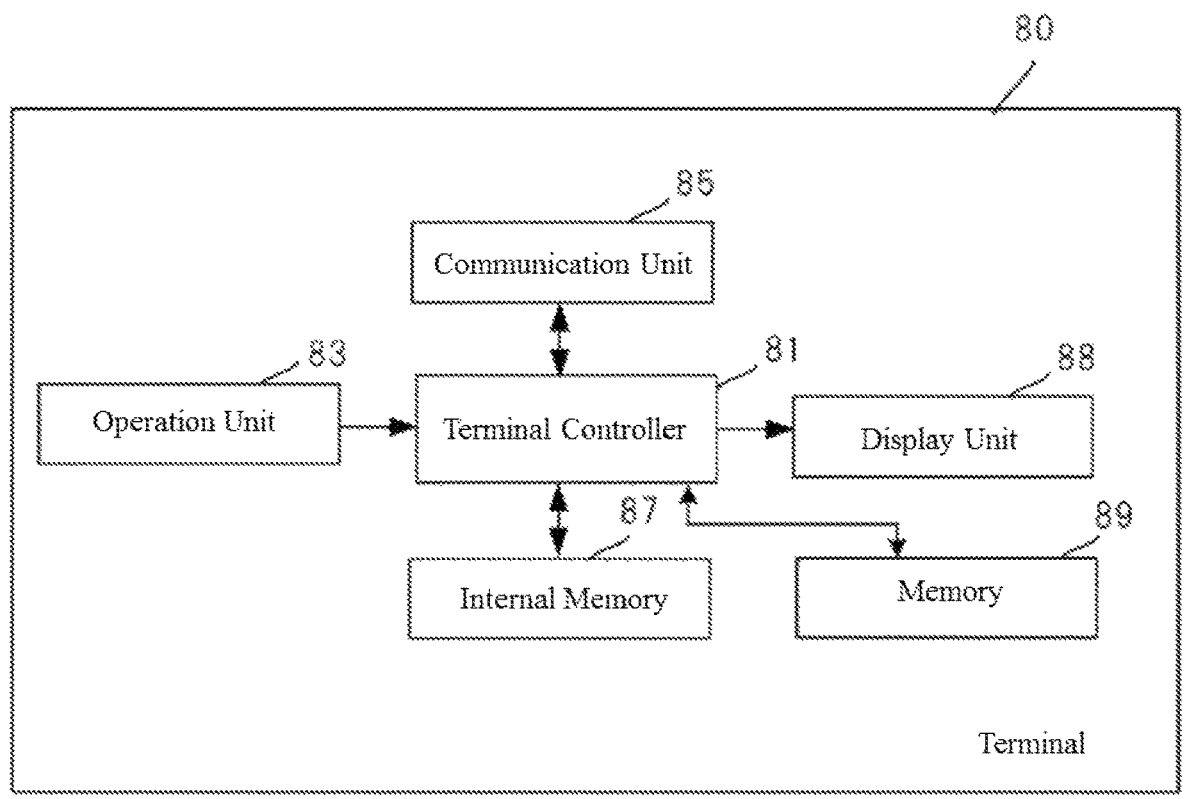
FIG. 8 illustrates a block diagram of an example of a hardware configuration of a terminal.

FIG. 8 illustrates a block diagram of an example of a hardware configuration of a terminal 80. The terminal 80 may include a terminal controller 81, an operation unit 83, a communication unit 85, an internal memory 87, a display unit 88, and a memory 89. The terminal 80 may be held by a user. The sender 50 may also be held by the user together with the terminal 80.

The terminal controller 81 may be configured using, for example, a CPU, an MPU, or a DSP. The terminal controller 81 may perform signal processing for overall control of the actions of various parts of the terminal 80, data input/output processing with other parts, data calculation processing, and data storage processing.

The terminal controller 81 may be able to acquire data, aerial photography images, and information (for example, living body information) from the UAV 100, the server device, and the sender 50 through the communication unit 85. The terminal controller 81 may be able to acquire data and information input through the operation unit 83. The terminal controller 81 may be able to acquire data, aerial photography images, and information stored in the internal memory 87 or the memory 89. The terminal controller 81 may be able to send data and information to the UAV 100, the server device, and the sender 50 through the communication unit 85. The terminal controller 81 may be able to send data, information, and aerial photography images to the display unit 88, and display information on the display unit 88 based on the data, information, and aerial photography images.

The terminal controller 81 may execute an application (a biological detection support application) for supporting living body detection. The terminal controller 81 may be able to generate various data used in the application.

The operation unit 83 may receive and acquire data and information input by a user of the terminal 80. The operation unit 83 may include buttons, keys, a touch display screen, a microphone, etc. Here, it is mainly exemplified that the operation unit 83 and the display unit 88 are constituted by a touch screen. In this case, the operation unit 83 may accept a touch operation, a click operation, a drag operation, etc. The operation unit 83 may be able to receive information of various parameters. Information inputted through the operation unit 83 may be sent to the UAV 100, the server device, and the sender 50.

The communication unit 85 may perform wireless communication with the UAV 100, the server device 40, and the sender 50 through various wireless communication methods. The wireless communication method for this wireless communication may include, for example, communication via a wireless LAN, Bluetooth (registered trademark), or a public wireless network. The communication unit 85 may perform wired communication using any wired communication method.

The internal memory 87 may include, for example, a ROM that stores a program specifying the operation of the terminal 80 and the data of setting values, or a RAM that temporarily stores various information and data used by the terminal controller 81 for processing. The internal memory 87 may include a memory other than the ROM and the RAM. The internal memory 87 may be disposed inside the terminal 80. The internal memory 87 may be set to be detachable from the terminal 80. The program may include an application program.

The display unit 88 may be configured using, for example, a liquid crystal display (LCD), and may display various information, data, aerial photographed images, and living body information outputted from the terminal controller 81. The display unit 88 may be able to display various data and information related to the execution of the application.

The memory 89 may save and store various data and information. The memory 89 may be an HDD, an SSD, an SD card, a USB memory, etc. The memory 89 may be disposed inside the terminal 80. The memory 89 may be set to be detachable from the terminal 80. The memory 89 may be able to store aerial photography images and living body information acquired from the UAV 100, the server device 40, and the sender 50.

The sender 50 may have the same components as those of the terminal 80, and therefore detailed descriptions are not provided herein again. The sender 50 may include a controller, an operation unit, a communication unit, an internal memory, etc. The operation unit may be, for example, a joystick for instructing control of the flight of the UAV 100. The sender 50 may include a display unit. The sender 50 may also have the same function as the terminal 80, and thus the terminal 80 may be omitted. The terminal 80 may have the same function as the sender 50, and thus the sender 50 may be omitted.

Figure 9:
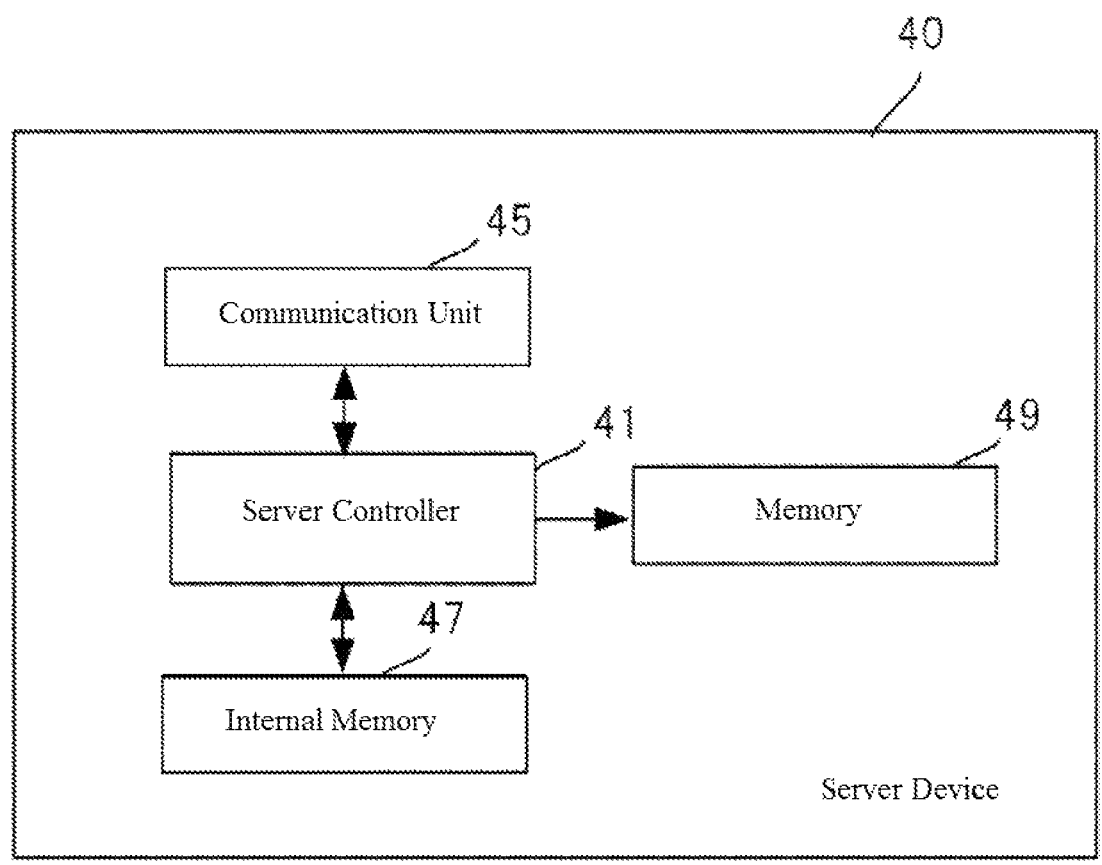
FIG. 9 illustrates a block diagram of an example of a hardware configuration of a server device.

FIG. 9 illustrates a block diagram of an example of a hardware configuration of a server device 40. The server device 40 may include a server controller 41, a communication unit 45, an internal memory 47, and a memory 49. The server device 40 may be disposed at the center for disaster relief, for example. The center may be equipped with monitors and may, under the control of the server controller 41, display various information processed by the server controller 41.

The server controller 41 may be configured using, for example, a CPU, an MPU, or a DSP. The server controller 41 may execute signal processing for overall control of the actions of various parts of the server device 40, data input/output processing with other parts, data calculation processing, and data storage processing.

The server controller 41 may be able to acquire data, aerial photography images, and information (for example, living body information) from the UAV 100, the sender 50, and the terminal 80 through the communication unit 45. The server controller 41 may be able to acquire data, aerial photography images, and information stored in the internal memory 47 or the memory 49. The server controller 41 may send data and information to the UAV 100, the sender 50, and the terminal 80 through the communication unit 45.

The server controller 41 may execute an application (a biological detection support application) for supporting living body detection. The server controller 41 may generate various data used in the application.

The communication unit 45 may perform wireless communication with the UAV 100, the sender 50, and the terminal 80 through various wireless communication methods. The wireless communication method for this wireless communication may include, for example, communication via a wireless LAN, Bluetooth (registered trademark), or a public wireless network. The communication unit 45 may perform wired communication using any wired communication method.

The internal memory 47 may include, for example, a ROM that stores a program specifying the operation of the server device 40 and the data of setting values, or a RAM that temporarily stores various information and data used by the server controller 41 for processing. The internal memory 47 may include a memory other than the ROM and the RAM. The internal memory 47 may be disposed inside the server device 40. The internal memory 47 may be set to be detachable from the server device 40. The program may include an application program.

The memory 49 may save and store various data and information. The memory 49 may be an HDD, an SSD, an SD card, a USB memory, etc. The memory 49 may be disposed inside the server device 40. The memory 49 may be set to be detachable from the server device 40. The server device 40 may be able to store aerial photography images and living body information acquired from the UAV 100, the sender 50, and the terminal 80.

In the following, various lengths related to the UAV 100 will be described.

Figure 10:
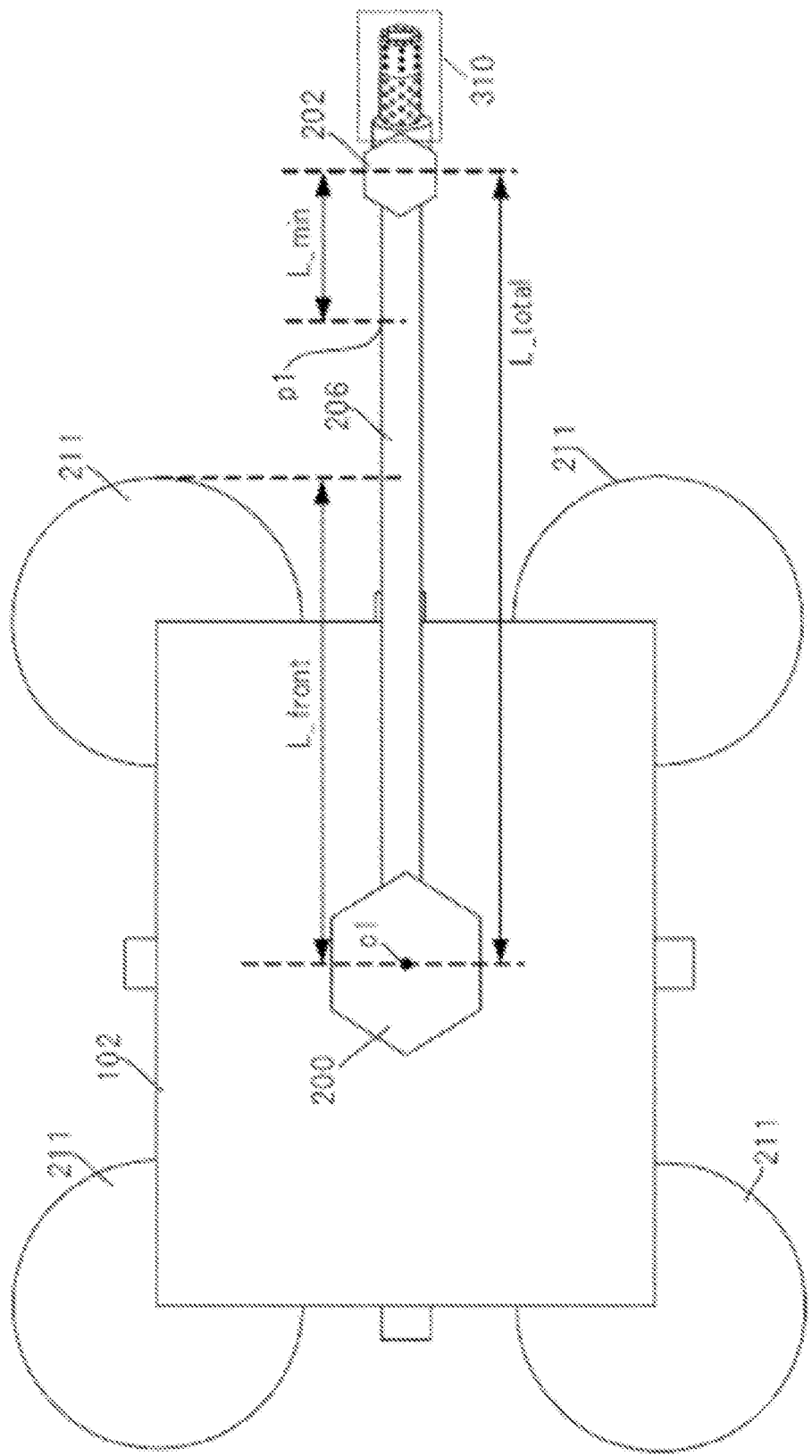
FIG. 10 illustrates a schematic diagram for explaining various lengths related to a UAV.

FIG. 10 illustrates a schematic diagram for explaining various lengths related to a UAV 100. In FIG. 10, the UAV 100 is viewed from directly below the UAV 100.

A length L1l may represent the entire length (full length) of the second lever 206, and may be also referred to as "L_Total". A length L2 may represent the distance from the center portion c1 of the first gimbal 200 (in other words, one end of the second lever 206) to the end of the rotor 211 in the front (right side in FIG. 10), and may be referred to as "L_front". That is, the length L2 may represent approximately half the length of the UAV 100 in the front-rear direction. A length L3 may represent, when the second lever 206 enters the investigation target (to enter a gap of the obstacles surrounding the investigation target) to allow the sensor unit 310 to operate, the shortest distance from the entry position $p_1$ to the second gimbal 202 (the center of the second gimbal 202), and may be referred to as "L_min", i.e., a length that the sensor unit 310 should enter the space where the investigation target is located (also called the investigation space) in order to allow the sensor unit 310 to detect living body information. When the portion of the second lever 206 corresponding to the length L3 enters the investigation space, the sensor unit 310 may be able to operate appropriately to detect living body information. L_min may be, for example, a cm-level length, and may be about 10 cm or 20 cm.

The length L2 may be an example of the length from one end of the second lever 206 to a first point of the second lever 206 that corresponds to the end of the rotor 211. The length L1 may be an example of the length from one end to the other end of the second lever 206. The length L3 may be an example of the length from the other end of the second lever 206 that is inserted into the investigation space where the investigation target is located to a second point.

In addition, the lengths L1 to L3 may all have fixed values. The length L3 may depend on the size of the detectable range of various sensors in the sensor unit 310.

Whether or not the second lever 206 enters the investigation space by a length L3 or more may be a condition for appropriately using the sensor unit 310. Therefore, in this embodiment, this condition may also be referred to as a "sensor condition". Thus, when the second lever 206 enters the investigation space with a length L3 or more, the sensor condition may be satisfied. When the second lever 206 enters the investigation space with a length less than the length L3, or when the second lever 206 does not enter the investigation space, the sensor condition may not be satisfied.

Here, the critical boundary that separates satisfaction and unsatisfaction of the sensor condition, i.e. the distance from the front end of the UAV 100 (the front end of the front rotor 211) to the obstacle when the second lever 206 enters exactly the length L3 in the investigation space inside the gap of the obstacles may be used as a reference length d.

When the second lever 206 enters a length longer than the length L3 in the investigation space, the UAV 100 may be located more forward than when the second lever 206 enters exactly the length L3. Therefore, the distance between the front end of the UAV 100 and the obstacle may be shorter than the reference length d. Thus, when the distance between the front end of the UAV 100 and the obstacle is shorter than the reference length d, the sensor condition may be satisfied. On the other hand, when the distance between the front end of the UAV 100 and the obstacle is longer than the length d, the sensor condition may not be satisfied.

Figure 25A:
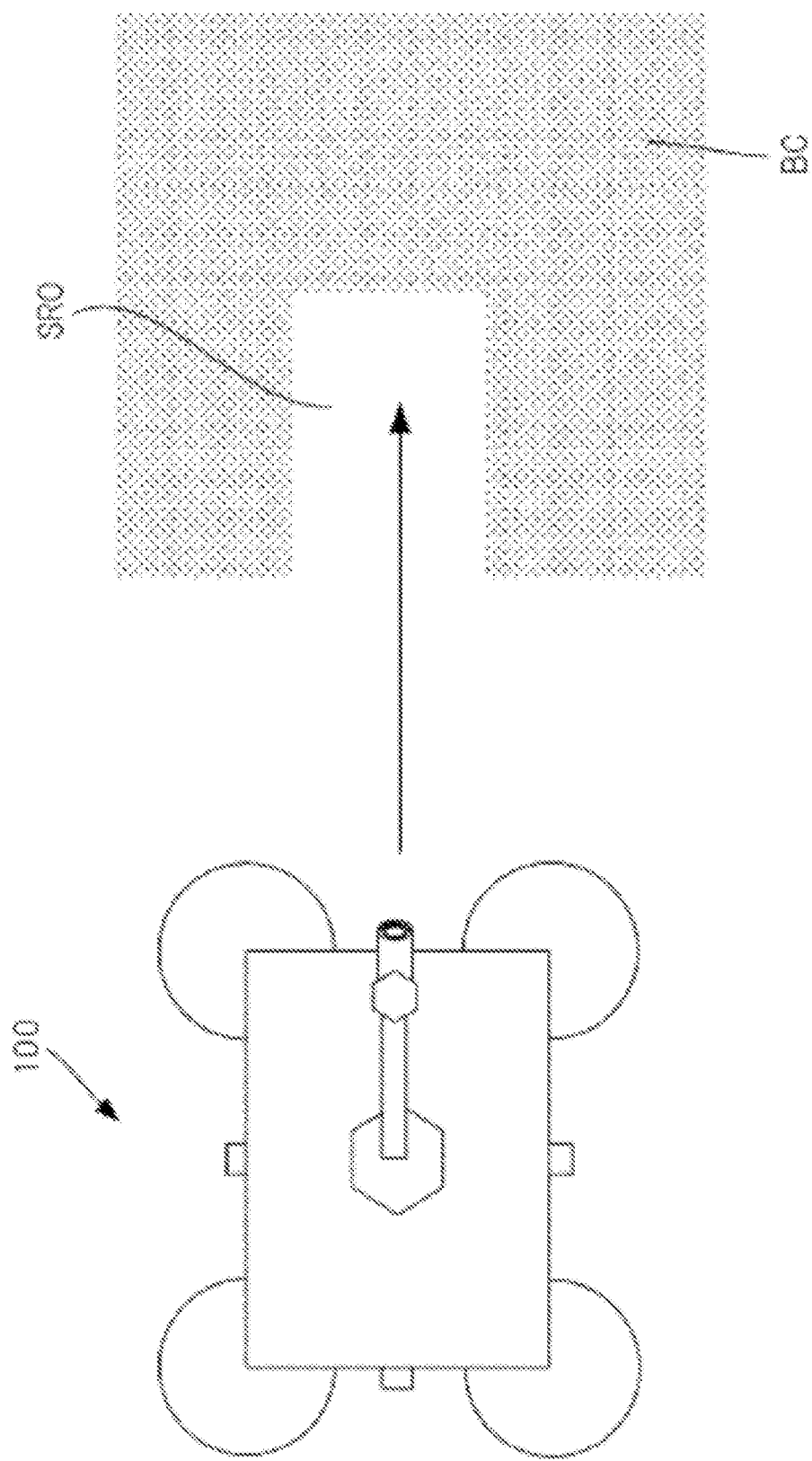
FIG. 25A illustrates a schematic diagram of an example of a position relationship between a UAV and an obstacle when left/right movement is not required.
Figure 25B:
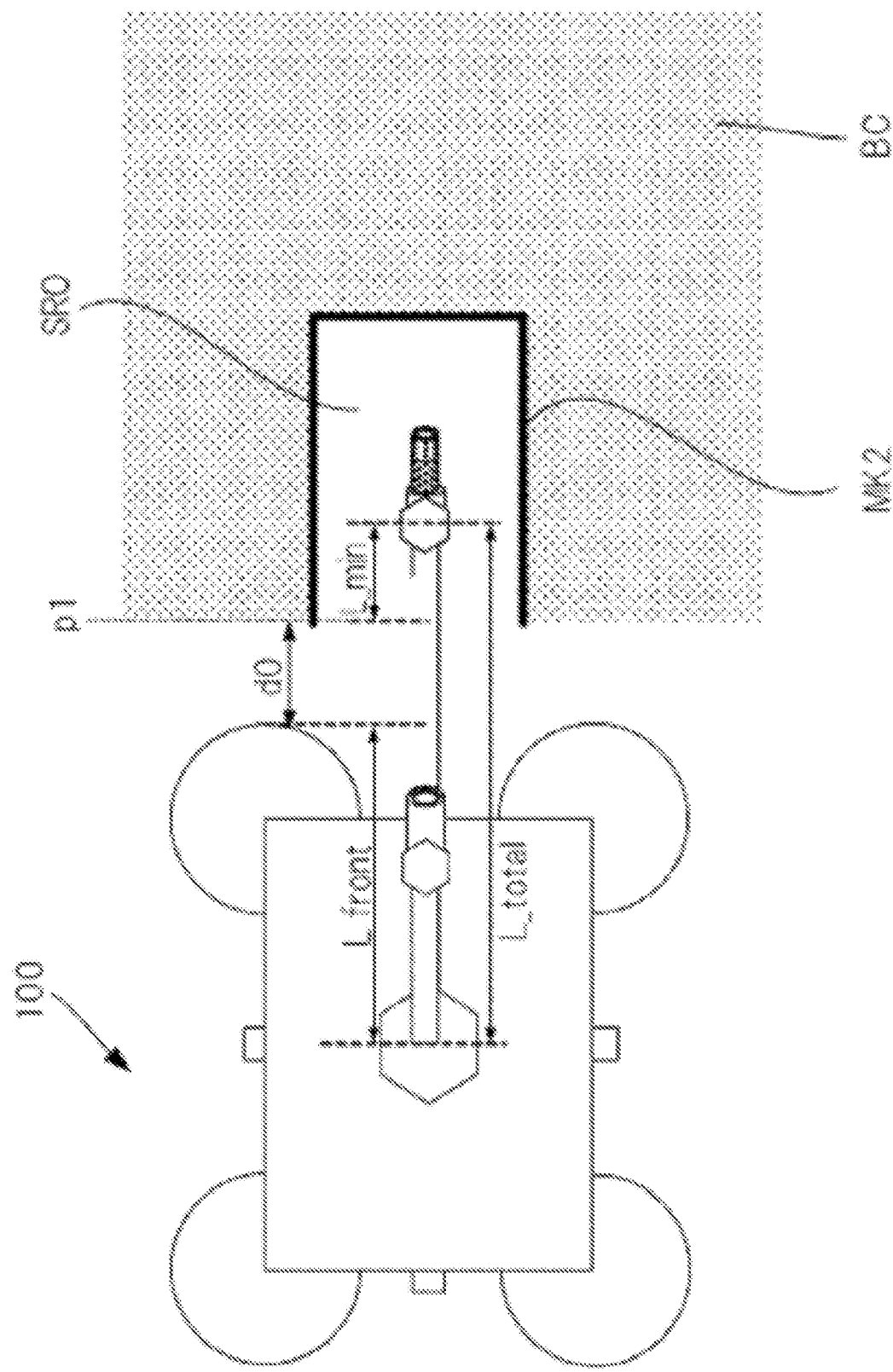
FIG. 25B illustrates a schematic diagram of an example of a position relationship between the UAV and the obstacle when the UAV approaches the investigation target from the state shown in FIG. 25A.
Figure 26A:
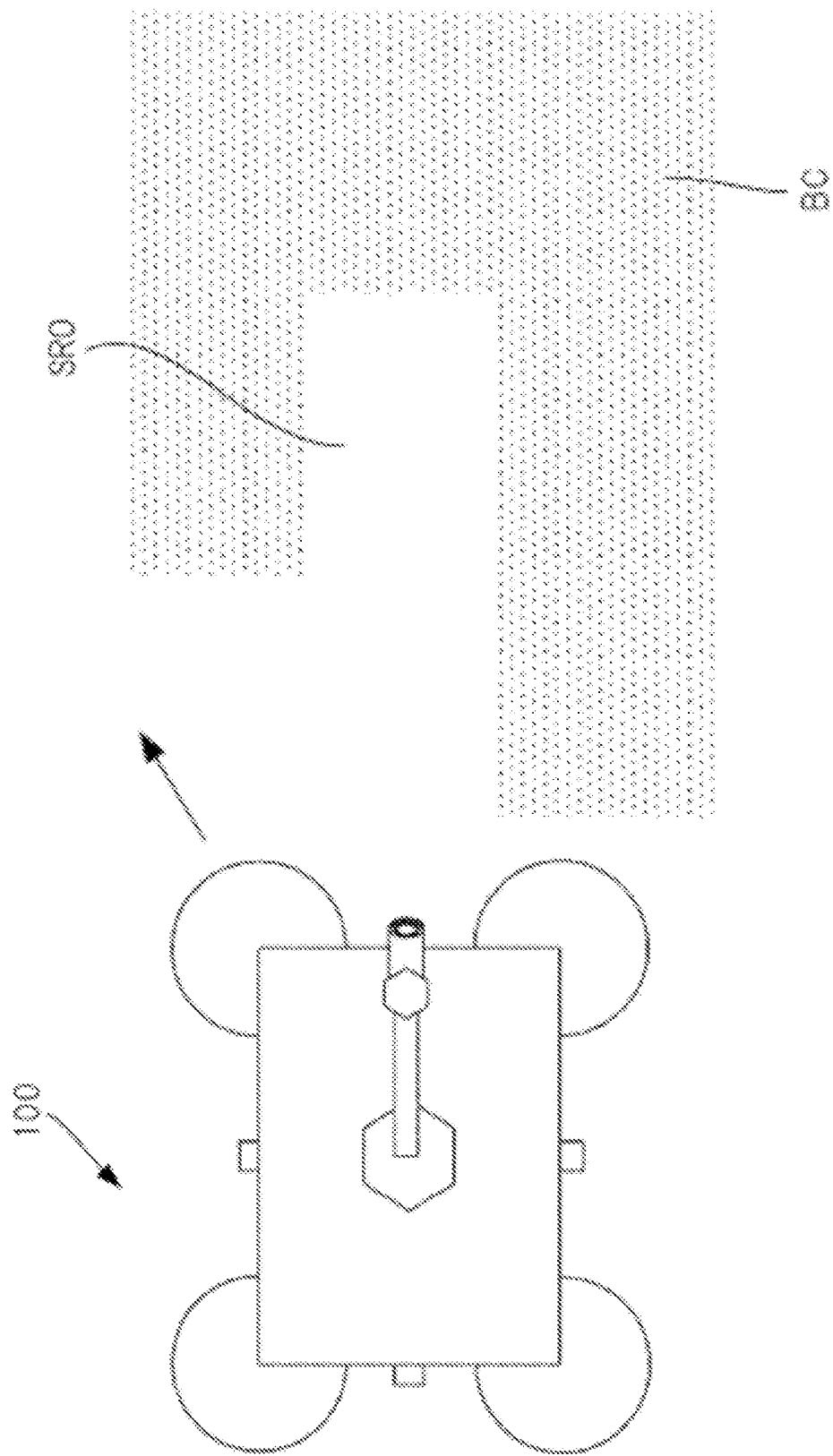
FIG. 26A illustrates a schematic diagram of an example of a position relationship between a UAV and an obstacle when left/right movement is required.
Figure 26B:
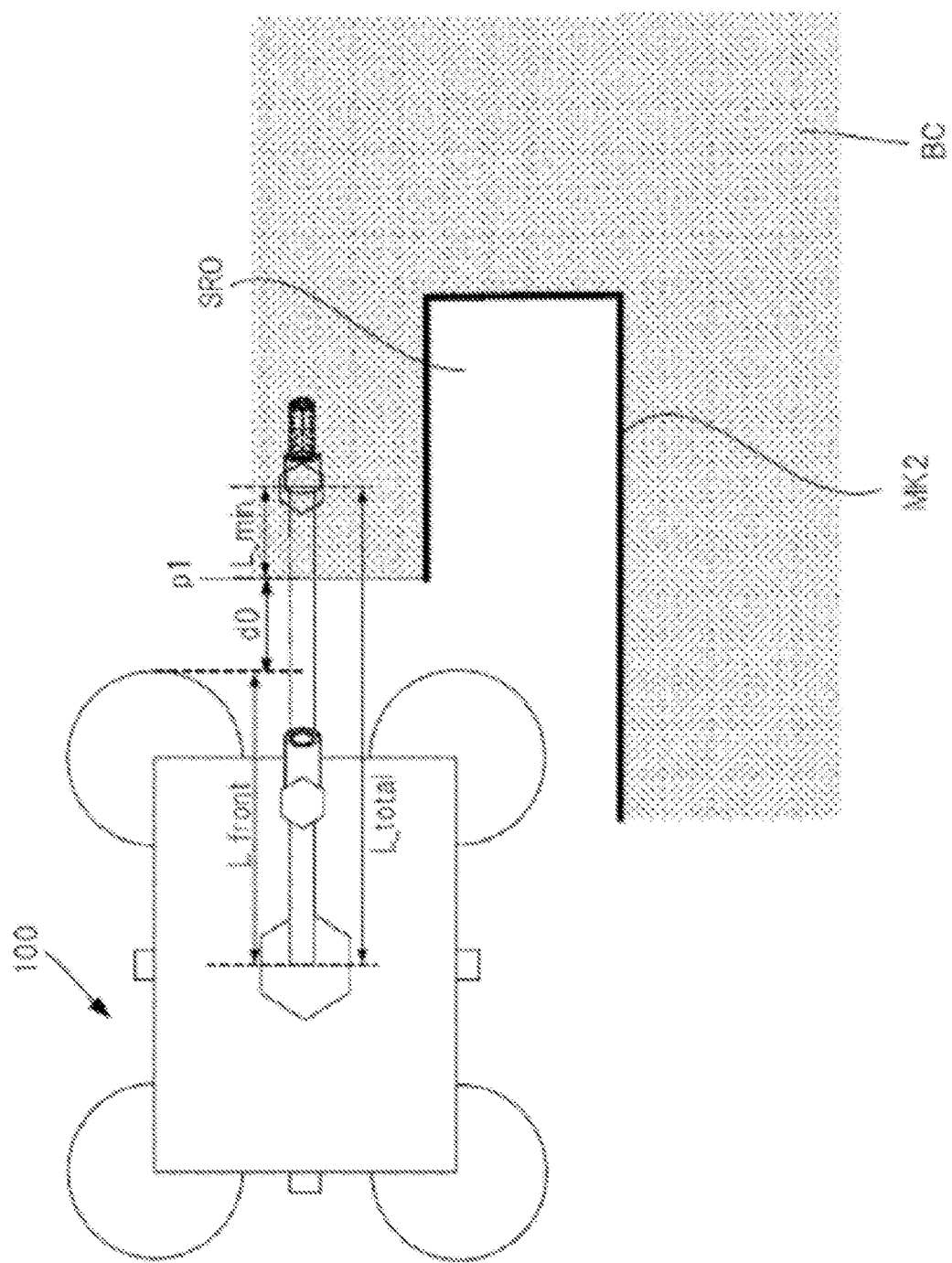
FIG. 26B illustrates a schematic diagram explaining a case where a UAV moves away from an obstacle.
Figure 26C:
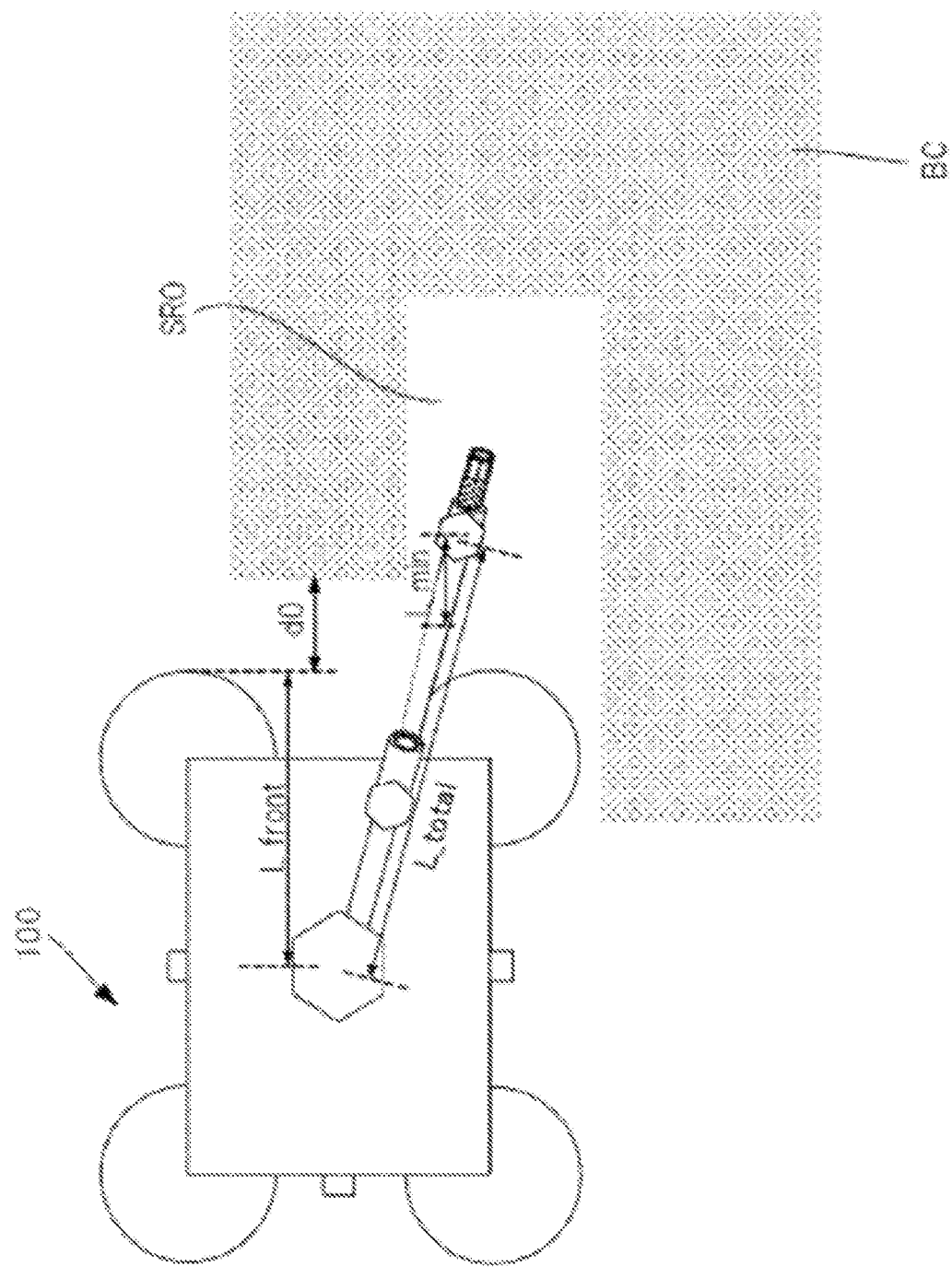
FIG. 26C illustrates a schematic diagram for explaining a case where an orientation of a second lever is changed.

As an example of the reference length d, a reference length when the second lever 206 extends in the reference direction may be taken as the reference length d0 (referring to FIGS. 25B, 26B, and 26C). As an example of the reference length d, a reference length when the second lever 206 extends in a direction changed from the reference direction may be used as the reference length dl (see FIG. 26D).

When detecting the living body information through the sensor unit 310, the UAV controller 110 may determine whether the sensor condition is satisfied. When the orientation of the second lever 206 is changed, the UAV controller 110 may determine whether the sensor condition is satisfied. When the orientation of the second lever 206 is changed, the UAV controller 110 may determine whether the sensor condition is satisfied.

Next, an example of living body detection using the living body detection system 10 that includes the UAV 100, the sender 50, and the terminal 80 will be described.

The living body detection system 10 may detect living bodies such as survivors buried in the ruins of a building destroyed by an earthquake, etc. In this case, the user may be able to use the sender 50, etc., to make the UAV 100 fly at a safe place. The UAV 100 may detect living body in a search area SR1 (investigation area), and may perform living body detection based on the living body information obtained by the UAV 100. Data communication between the UAV 100 and the sender 50 or the terminal 80 held by the user may be performed through wireless communication, etc.

In the UAV 100, the UAV controller 110 may have a function related to a living body detection and may perform processing related to living body detection. The sender 50 may have a function related to supporting the living body detection, and may perform processing related to supporting the living body detection. In the terminal 80, the terminal controller 81 may have a function related to supporting the living body detection, and may perform a process related to supporting the living body detection. In the server device 40, the server controller 41 may have a function related to supporting the living body detection, and perform processing related to supporting the living body detection.

Figure 11:
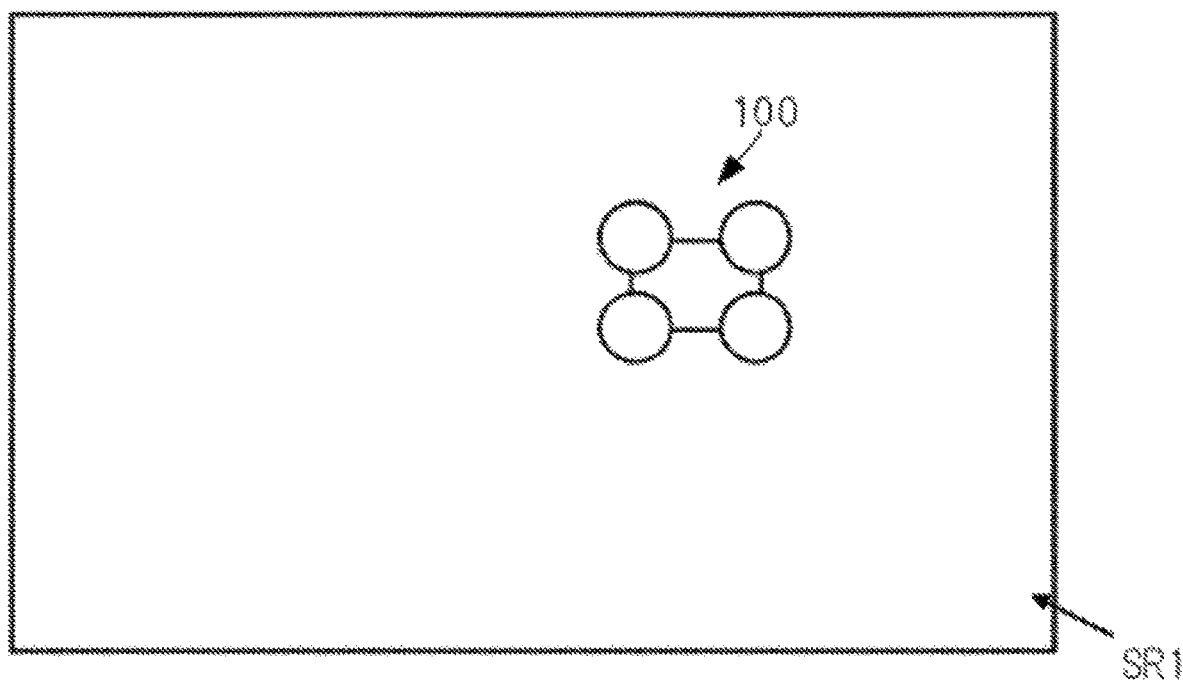
FIG. 11 illustrates a schematic diagram of an example of an operation area.

FIG. 11 illustrates a schematic diagram of an example of an operation area Al.

The UAV 100 may fly in the area of the search area SR1 (an example of the investigation area). The UAV controller 110 may obtain operation information (instruction information for flight control) from the sender 50 and move the UAV 100 within the search area SR1 based on the operation information. That is, the UAV 100 may perform a flight operation through a user operation (manually). The UAV controller 110 may acquire the flight-path information from the internal memory 160, etc., and make the UAV 100 move within the search area SR1 according to the flight-path information. The UAV controller 110 may obtain detection information detected by the sensor unit 310 and move the UAV 100 within the search area SR1 according to the detection information. That is, the UAV 100 may be able to perform flight control without user operation (automatically).

For example, in images captured by the camera unit 316, when an investigation target (for example, a living body) is identified in the images through image recognition, the UAV controller 110 may make the UAV 100 move in a predetermined range that includes the identified investigation target, or move toward the identified investigation target. The investigation target here may be a specific object (a living body, etc.), or a specific place (a place where there seems to be a survivor, etc.). In addition, the living body may be a living body other than a human body (for example, an animal such as a dog, a cat, etc.)

When the carbon dioxide sensor 311 detects carbon dioxide that is greater than a threshold value th1, which indicates the presence of a living body, the UAV controller 110 may move the UAV 100 within a predetermined range including the position where the carbon dioxide is detected, and may also move it toward the position where the carbon dioxide is detected.

When a temperature of a living body (for example, a temperature of about 36 to 37° C.) is detected by the infrared sensor 315, the UAV controller 110 may move the UAV 100 within a predetermined range including the position where the temperature of the living body is detected, and may also move it toward the position where the temperature of the living body is detected.

When a certain sound is detected through the microphone 317, the UAV controller 110 may move the UAV 100 within a predetermined range including the position where the sound is detected, and may also move it toward the position where the sound is detected.

When a predetermined sound (for example, a sound made by a human, or a sound of animal barking) is detected through the microphone 317, the UAV controller 110 may move the UAV 100 within a predetermined range including the position where the predetermined sound is detected, and may also move it toward the position where the predetermined sound is detected.

Figure 12:
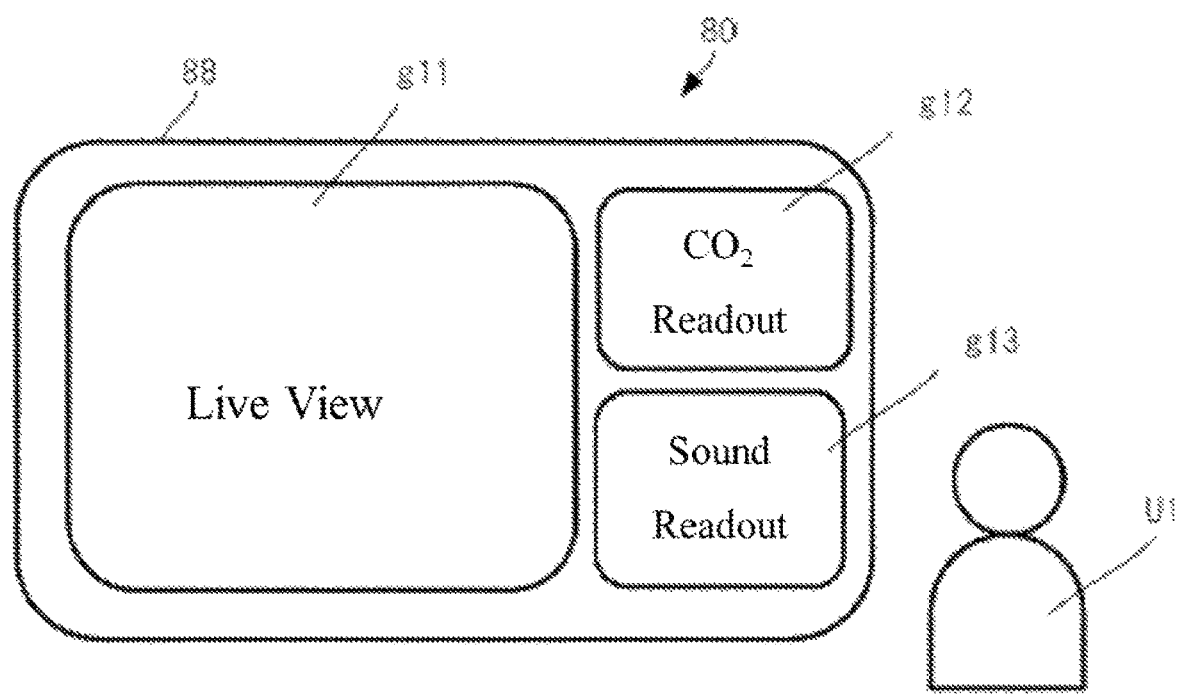
FIG. 12 illustrates a schematic diagram of a display example of a display unit on a terminal.

FIG. 12 illustrates a schematic diagram of a display example of a display unit 88 on a terminal 80. The terminal 80 may be, for example, a PC, a smartphone, or a sender 50.

In FIG. 12, the display unit 88 may display a live view image g11, a detection value (Readout) of carbon dioxide measured by the carbon dioxide sensor 311, and a detection value (Readout) of sound measured by the microphone 317. The display information is an example of information displayed by the display unit 88. In other examples, other detection values detected by the sensor unit 310 may be displayed. In the terminal 80, the terminal controller 81 may acquire information of the live view image g11, the detection value of carbon dioxide, and the detection value of sound from the UAV 100 through the communication unit 85. The live view image g11 may be an image captured by the camera unit 316 when at least one of the visible-light LED 312 or the infrared LED 313 is emitting light, or may be an image captured by the camera unit 316 when both the visible-light LED 312 and the infrared LED 313 are not emitting light.

Figure 13:
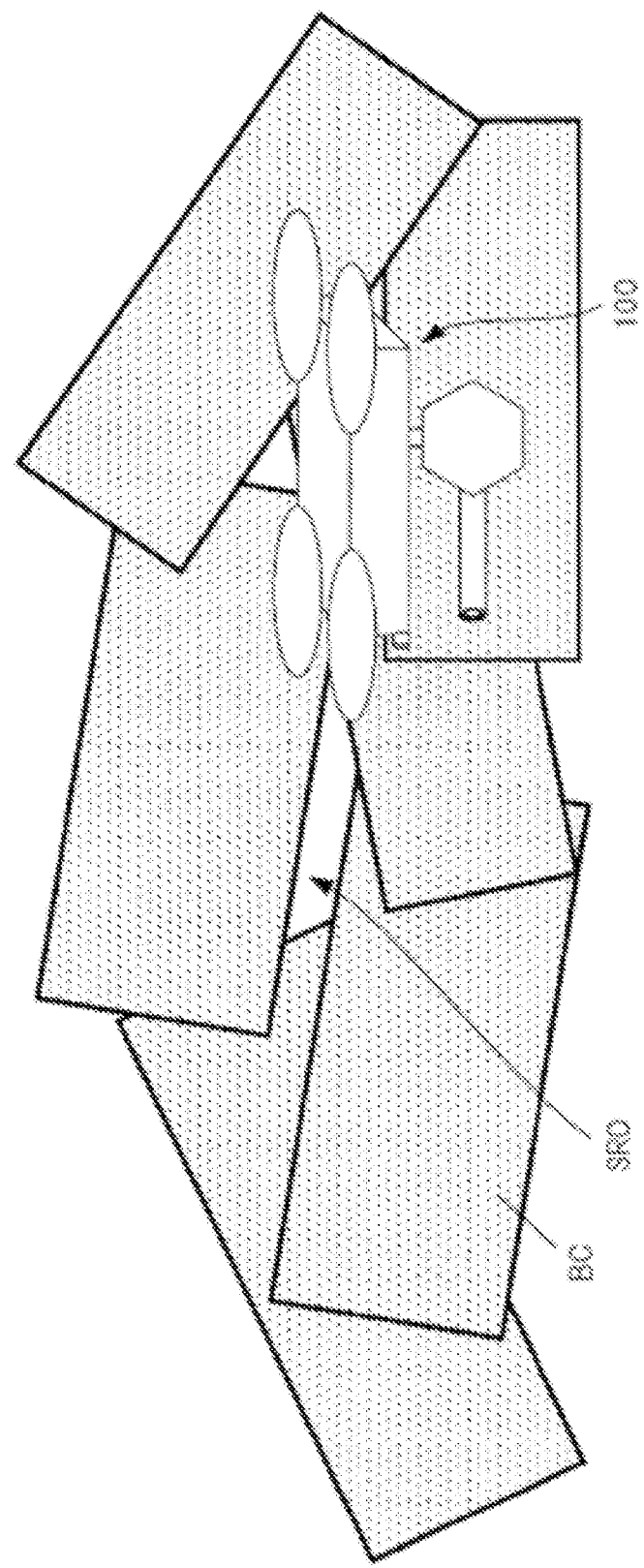
FIG. 13 illustrates a schematic diagram of an example of an investigation target surrounded by obstacles.

FIG. 13 illustrates a schematic diagram of an example of an investigation target SRO surrounded by obstacles BC. For example, the obstacles BC may be a part of a building or furniture that collapsed due to an earthquake, or may be rubble. The UAV 100 flying in the area of the search area SR1 close to the obstacles BC may approach the investigation target SRO.

Figure 14:
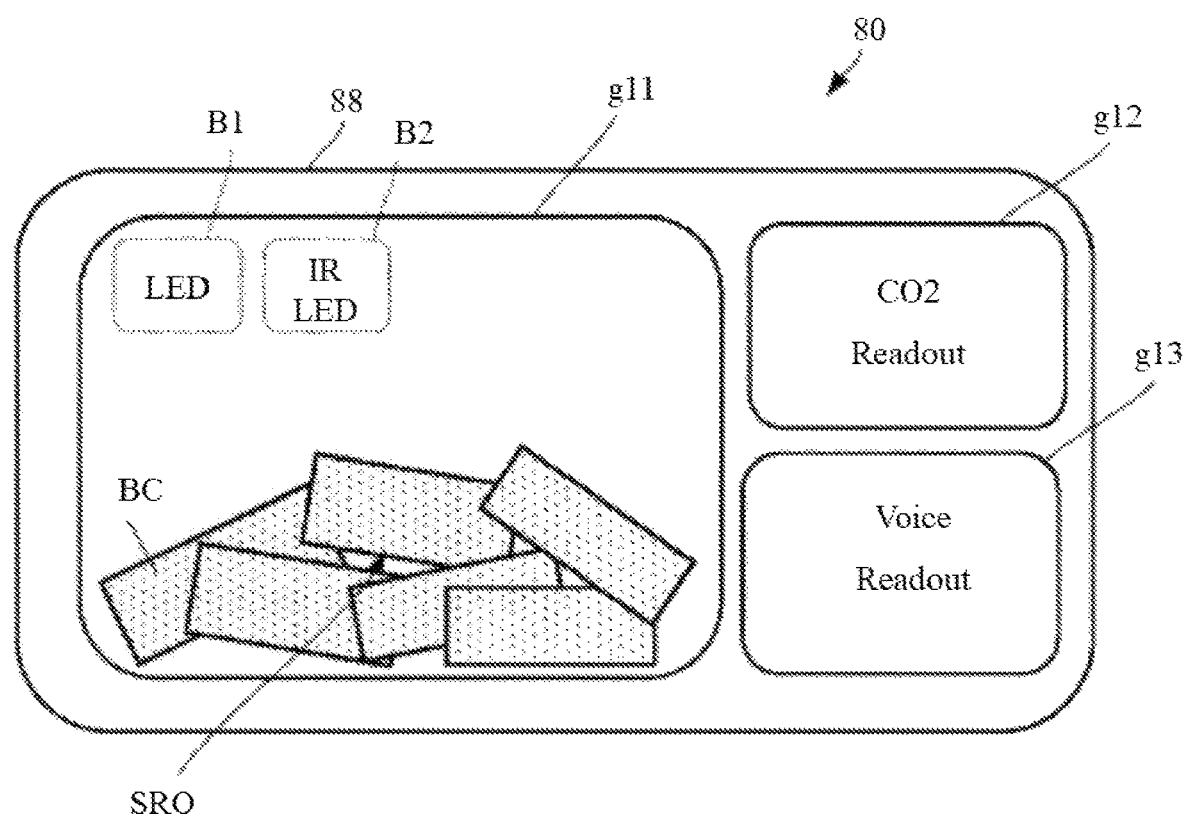
FIG. 14 illustrates a schematic diagram of a display example around obstacles displayed by a display unit.

FIG. 14 illustrates a schematic diagram of a first display example around obstacles BC displayed by a display unit 88. The live view image g11 shown in FIG. 14 may be an image captured by the camera unit 316 of the UAV 100 of FIG. 13 that is approaching the obstacles BC. At this time, the sensor unit 310 may not turn on the power (operable state). Therefore, various information may not be detected by the sensors in the sensor unit 310. Thus, the terminal controller 81 of the terminal 80 may not acquire the detection value of the carbon dioxide sensor 311 included in the sensor unit 310 or the detection value of the microphone 317 included in the sensor unit 310, and may not display any detection value as the detection result of the sensor on the display unit 88.

In addition, when an input (for example, pressing) of the display area for the sensor detection value through the operation unit 83 is detected, the terminal controller 81 may send switch-instruction information, used to instruct the sensor switch corresponding to the sensor that detects the input, to the UAV 100 through the communication unit 85.

In the UAV 100, the UAV controller 110 may obtain the switch-instruction information through the communication interface 150, and switch to a suitable switch state of the sensor according to the switch-instruction information. The display area for the sensor detection value may include, for example, a display area g12 for the detection value of carbon dioxide measured by the carbon dioxide sensor 311, or a display area g13 for the detection value of the sound signal measured by the microphone 317. That is, when the display area g12 is pressed, the carbon dioxide sensor 311 may be turned on or off. When the display area g13 is pressed, the microphone 317 may be turned on or off.

By switching the on/off states of various sensors included in the sensor unit 310, the UAV 100 may be able to avoid the situation where the sensor unit 310 is kept on when not in use, and may reduce the power consumption of the sensor unit 310. In addition, since the terminal 80 is able to instruct the switches of various sensors through the operation unit 83, the switching states of the various sensors may be switched intuitively and easily.

In the area of the live view image g11 in the display unit 88, there are an LED button B1 which indicates an on/off state of the visible-light LED 312, and an IR LED button B2 which indicates an on/off state of the infrared LED 313. For example, the on state of the visible-light LED 312 and the infrared LED 313 may be indicated by a solid line, and the off state of the visible-light LED 312 and the infrared LED 313 may be indicated by a dashed line. In FIG. 14, the LED button B1 and the IRLED button B2 are indicated by dotted lines, indicating that the visible-light LED 312 and the infrared LED 313 are off.

In addition, when an input (for example, pressing) of the LED button B1 through the operation unit 83 is detected, the terminal controller 81 may switch between the on state and the off state of the visible-light LED 312. Similarly, when an input (for example, pressing) of the IR LED button B2 through the operation unit 83 is detected, the terminal controller 81 may switch between the on state and the off state of the infrared LED 313.

The user may confirm the situation of the search area SR1 (the situation on the spot) through the display unit 88 of the terminal 80 based on the live view image g11. The UAV 100 may move manually or automatically to approach the investigation target SRO or the obstacles BC surrounding the investigation target SRO. When approaching the obstacles BC, the UAV controller 110 of the UAV 100 may hold the second lever 206 in a horizontal direction (a direction parallel to the roll axis and the pitch axis), and control the sensor unit 310 to be oriented to the forward direction of the UAV 100. The UAV controller 110 may control the flight so that the UAV 100 approaches, for example, a gap of the plurality of obstacles BC. As a result, the UAV 100 may approach, for example, an investigation target SRO (for example, a living body) located inside the gap of the plurality of obstacles BC.

Figure 15:
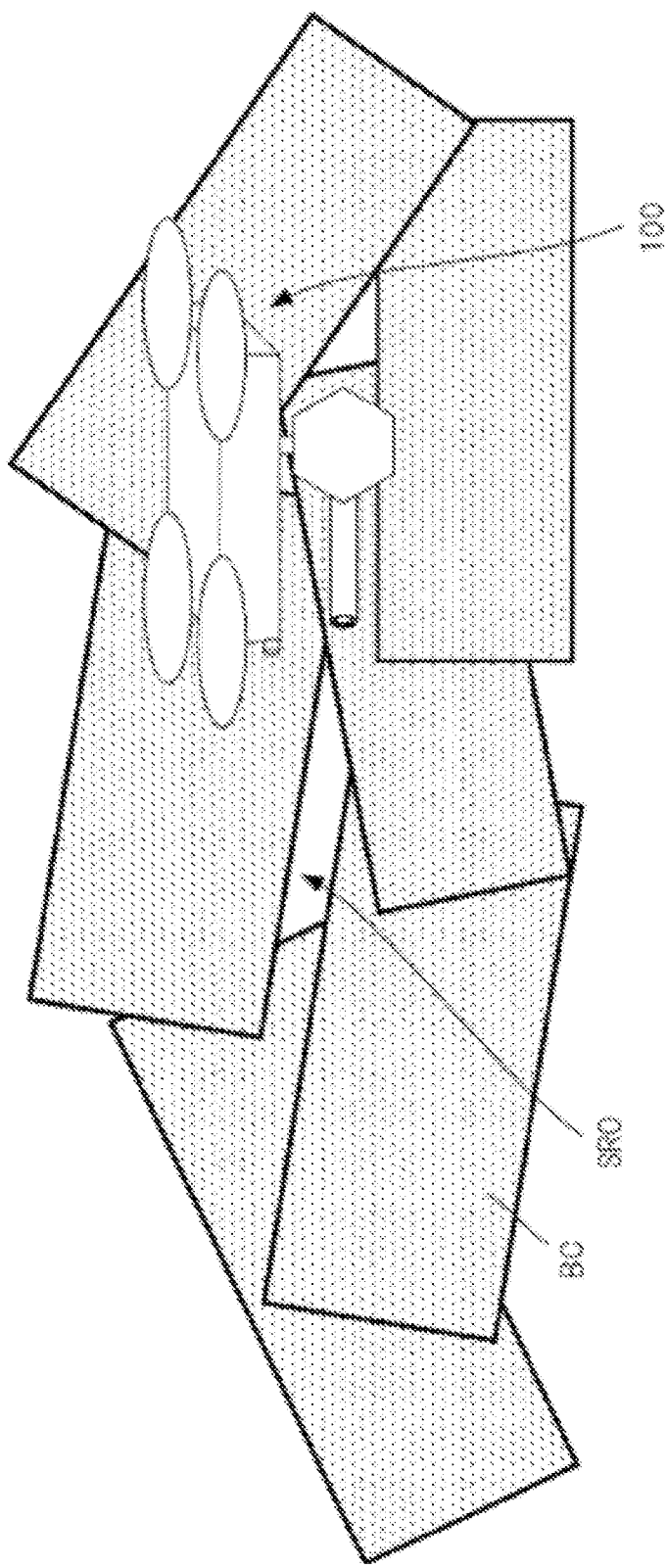
FIG. 15 illustrates a schematic diagram of another example of an investigation target surrounded by obstacles.

FIG. 15 illustrates a schematic diagram of another example of an investigation target SRO surrounded by obstacles BC. The UAV 100 flying in the area of the search area SR1 close to the obstacles BC may be, as compared to that shown in FIG. 13, closer to the investigation target SRO.

Figure 16:
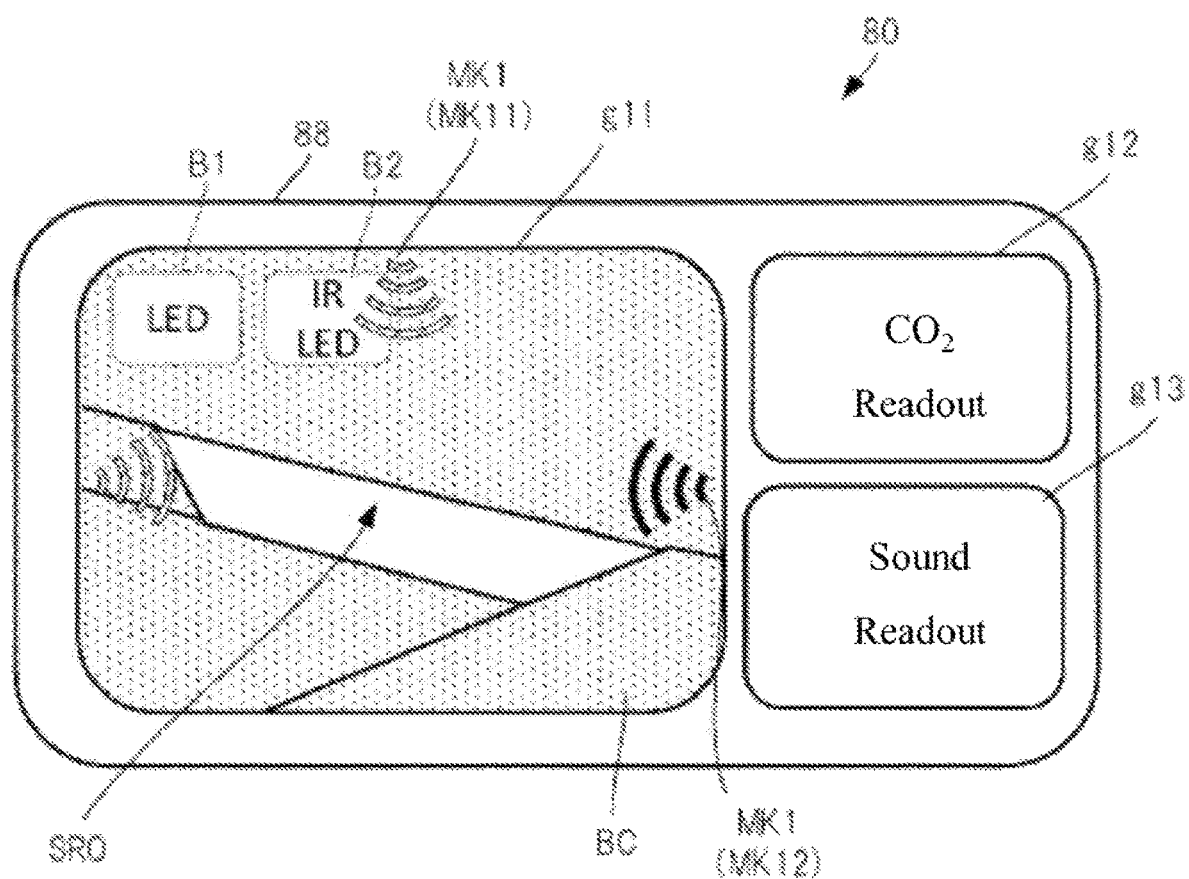
FIG. 16 illustrates a schematic diagram of another display example around obstacles displayed by a display unit.

FIG. 16 illustrates a schematic diagram of another display example around obstacles BC displayed by a display unit 88. The live view image g11 shown in FIG. 16 is an image captured by the camera unit 316 of the UAV 100 of FIG. 15, which, as compared to that shown in FIG. 14, may be closer to the investigation target SRO. In FIG. 16, the camera unit 316 included in the sensor unit 310 may be adjusted to face the investigation target SRO so that the camera unit 316 may be able to confirm the investigation target SRO surrounded by the obstacles BC. The orientation of the camera unit 316 may be controlled by the UAV controller 110.

In addition, at the timing of FIG. 16, the first ultrasonic sensor 280 may be powered on and may operate. The first ultrasonic sensor 280 may measure the distance from the first ultrasonic sensor 280 (that is, from the UAV 100) to the investigation target SRO and the obstacle BC. In the terminal 80, the terminal controller 81 may acquire the distance measurement result of the first ultrasonic sensor 280 through the communication unit 85. The terminal controller 81 may display an obstacle-approaching sign MK1 (for example, MK11, MK12) indicating that an obstacle BC is present nearby on the display unit 88 based on the obtained distance measurement result. The obstacle-approaching sign MK1 may be expressed by, for example, a sign indicating that ultrasonic waves are being transmitted, or another sign.

For example, the display unit 88 may divide the distance into distance segments in a step manner, and may display the obstacle-approaching sign MK1 in a display manner corresponding to the distance segment. The distance from the UAV 100, in which the live view image g11 is captured, to the obstacle BC may be about 2 m in front and on left, and less than 1 m on the right. For example, when the above-mentioned distance is about 2 m, an obstacle-approaching sign MK11 (for example, including a slashed line or a yellow sign) may be displayed. When the above-mentioned distance is about 1 m, the obstacle-approaching sign MK1 may be represented by an obstacle-approaching sign MK12 (for example, a blacked-out sign or a red sign).

The display manner can be represented by, for example, the display color, the display mode (such as lighting, blinking), and other display corresponding to the obstacle-approaching sign MK1. In addition, the terminal controller 81 may output the sound using the obstacle-approaching information as the sound information, together with the display of the obstacle-approaching sign MK1 or replacing the display of the obstacle-approaching sign MK1. In this case, the terminal controller 81 may change the sound-output manner according to the distance segment. In addition, the terminal controller 81 may present the obstacle-approaching information using other presentation methods instead of display or sound output.

As such, the first ultrasonic sensor 280 may measure the distance from obstacles BC present around the investigation target SRO. When the distance (the measured distance) measured by the first ultrasonic sensor 280 is less than a threshold value th2 (a safety distance to ensure safety), the UAV controller 110 may display this status on the display unit 88 of the terminal 80. In this case, the UAV controller 110 may send the status, where the measurement distance is less than the safety distance (an example of the first notification information), to the terminal 80 through the communication interface 150. The terminal controller 81 may acquire the status, where the measurement distance is less than the safety distance, through the communication unit 85, and display the status, where the measurement distance is less than the safety distance (for example, the obstacle-approaching sign MK1), on the display unit 88. The UAV controller 110 may manually or automatically avoid the obstacle BC to adjust the position of the UAV 100 and bring the UAV 100 closer to the investigation target SRO. In this case, the user can confirm that the measured distance is less than the safety distance by displaying the obstacle-approaching sign MK1 through the display unit 88 of the terminal 80. By operating the sender 50, the sender 50 can instruct the flight control of the UAV 100, and instruct the adjustment of the position of the UAV 100. In addition, the threshold value th2 (the safety distance) may be longer than the reference length d.

Therefore, the terminal 80 may notify the UAV 100 that it is approaching the obstacles BC by displaying the obstacle-approaching sign MK1. Thus, the user may carefully perform an operation for instructing the flight control of the UAV 100 while confirming the obstacle-approaching sign of the display unit 88.

Figure 17:
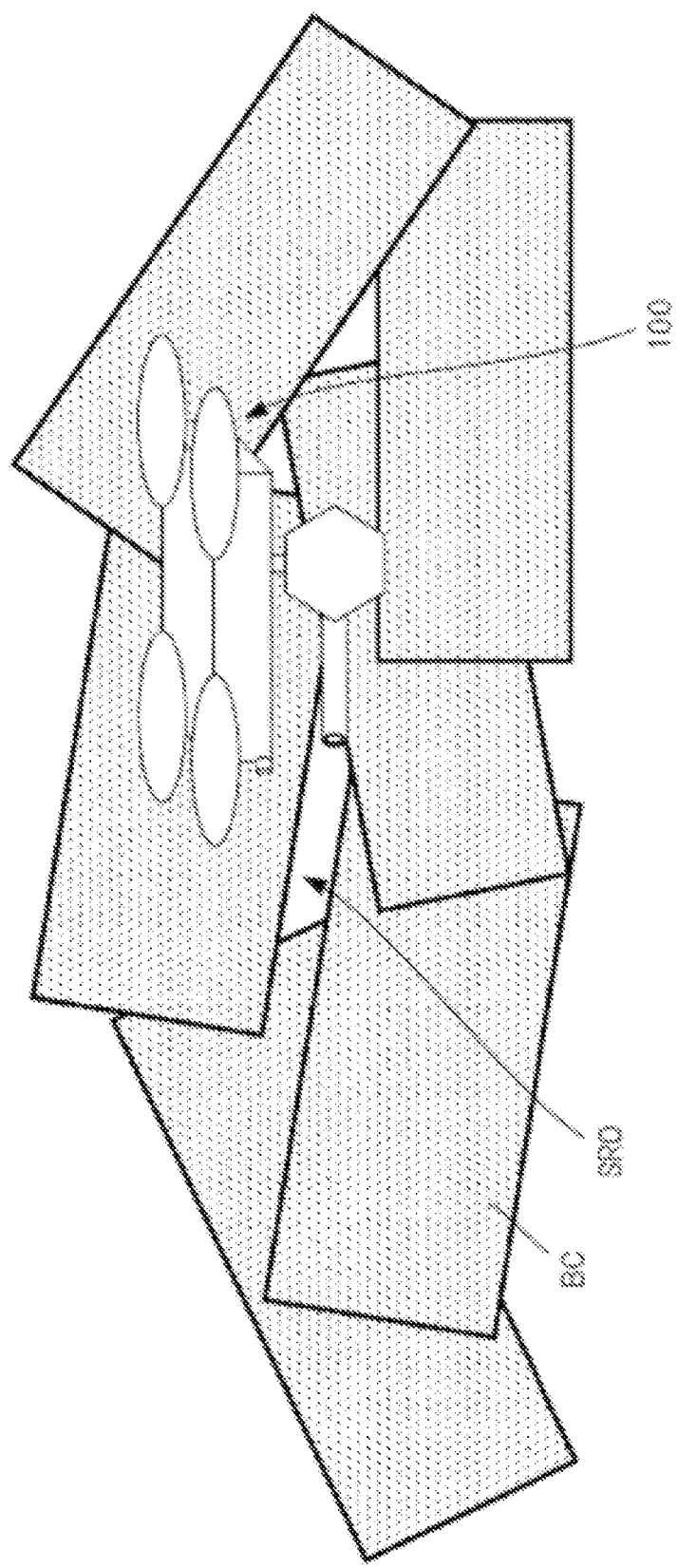
FIG. 17 illustrates a schematic diagram of another example of an investigation target surrounded by obstacles.

FIG. 17 illustrates a schematic diagram of another example of an investigation target SRO surrounded by obstacles BC. The UAV 100 flying in the area of the search area SR1 close to the obstacles BC may be, as compared to that shown in FIG. 15, closer to the investigation target SRO.

Figure 18:
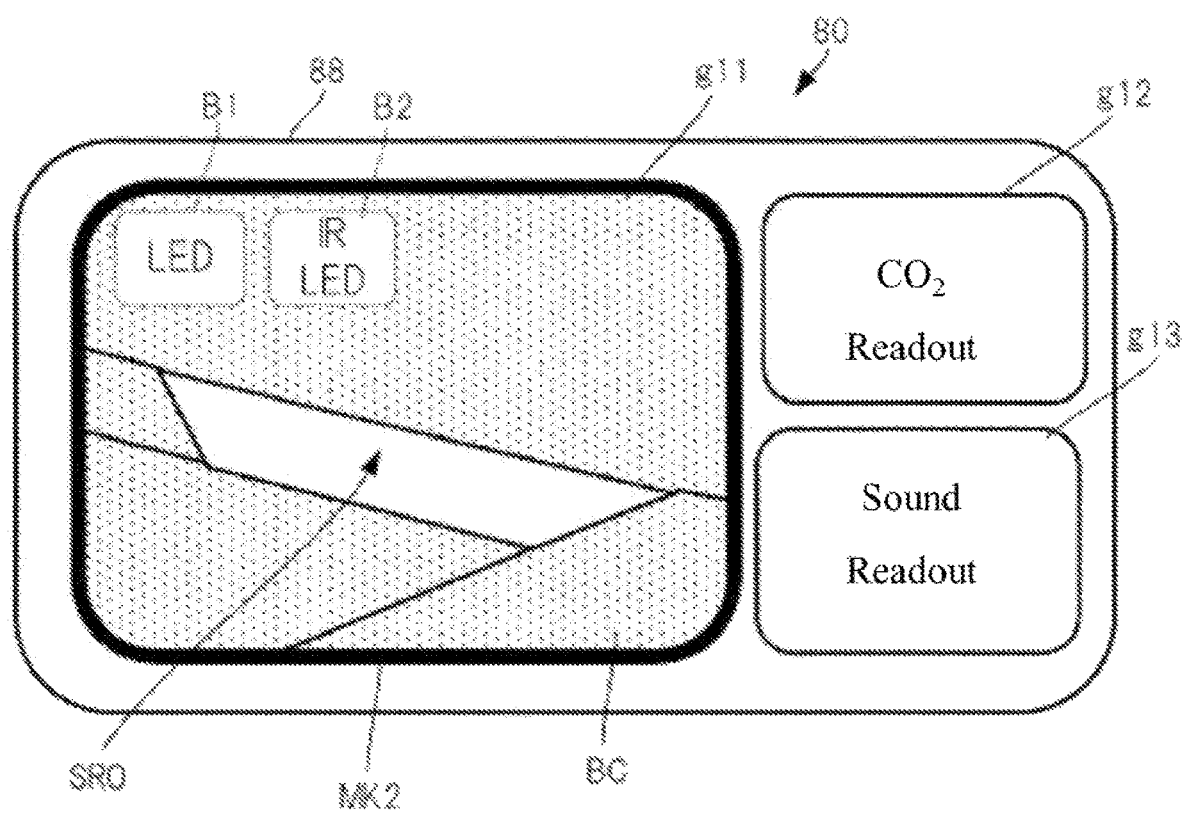
FIG. 18 illustrates a schematic diagram of another display example around obstacles displayed by a display unit.

FIG. 18 illustrates a schematic diagram of another display example around obstacles BC displayed by a display unit 88. The live view image g11 shown in FIG. 18 is an image captured by the camera unit 316 of the UAV 100 of FIG. 17, which, as compared to that shown in FIG. 16, may be closer to the investigation target SRO. In FIG. 18, the camera unit 316 included in the sensor unit 310 may be adjusted to face the investigation target SRO so that the camera unit 316 may be able to confirm the investigation target SRO surrounded by the obstacles BC. The orientation of the camera unit 316 may be controlled by the UAV controller 110.

In FIG. 18, the display unit 88 may superimpose the display of a sensor-condition satisfaction sign MK2 on the live view image g11. Through the sensor-condition satisfaction sign MK2, the outer edge of the display area of the live view image g11 may be highlighted (emphasized display). When the sensor condition is satisfied, that is, when the measurement distance to the obstacle BC measured by the first ultrasonic sensor 280 is shorter than a threshold value th3, the terminal controller 81 may display such a sensor-condition satisfaction sign MK2. The threshold th3 may be the same as the reference length d0 described above. The sensor-condition satisfaction sign MK2 may be, for example, a thick frame indicated by the outer edge of the display area of the live view image g11. In addition, the sensor-condition satisfaction sign MK2 may be, for example, a green frame indicated by the outer edge of the display area of the live view image g11. That is, the manner of display (the thickness of the frame, the color of the frame, and other display manners) for the sensor-condition satisfaction sign MK2 may be a way that attracts attention of the live view image g11.

The sensor condition may be satisfied when the measurement distance is shorter than the threshold th3, and the sensor condition may not be satisfied when the measurement distance is above the threshold th3. The satisfaction of the sensor condition may refer to that data related to the investigation target SRO can be detected by the sensor unit 310. In this case, it may refer to that data related to the investigation target SRO can be detected by at least one sensor in the sensor unit 310. In addition, it may refer to that data related to the investigation target SRO can be detected by at least one of the sensors whose power is turned on in the sensor unit 310.

As such, the user may be able to, through the confirmation of the sensor-condition satisfaction sign MK2 displayed on the display unit 88, obtain the status that the data (living body information) can be detected by the sensor unit 310 by extending the second lever 206. Therefore, the UAV 100 may be able to detect living body information through the sensor unit 310 without moving from the position at this time. That is, the UAV 100 and the living body detection system 10 may prompt the user of the status that the sensor unit 310 can detect living body information, and the user may refer to the prompt to advance the procedure of living body detection. Therefore, the UAV 100 and the living body detection system 10 may improve the living body detection efficiency.

Figure 19:
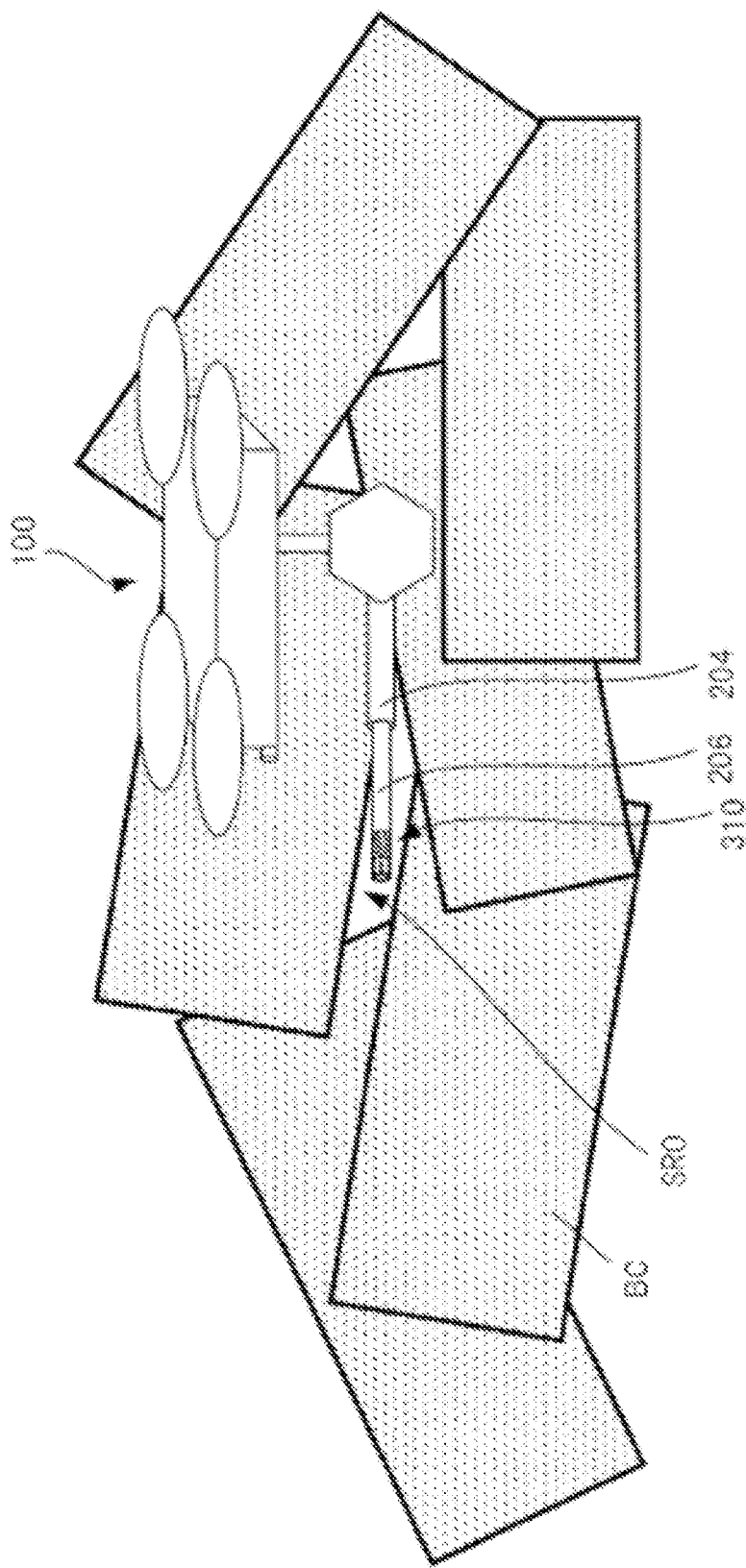
FIG. 19 illustrates a schematic diagram of another example of an investigation target surrounded by obstacles.

FIG. 19 illustrates a schematic diagram of another example of an investigation target SRO surrounded by obstacles BC. The UAV 100 flying in the area of the search area SR1 close to the obstacles BC may be, as compared to that shown in FIG. 17, closer to the investigation target SRO. In addition, in FIG. 19, the orientation of the second lever 206 may be adjusted as necessary, the second lever 206 may be inserted into a gap of the obstacles BC, and the sensor unit 310 may enter the investigation space.

Figure 20:
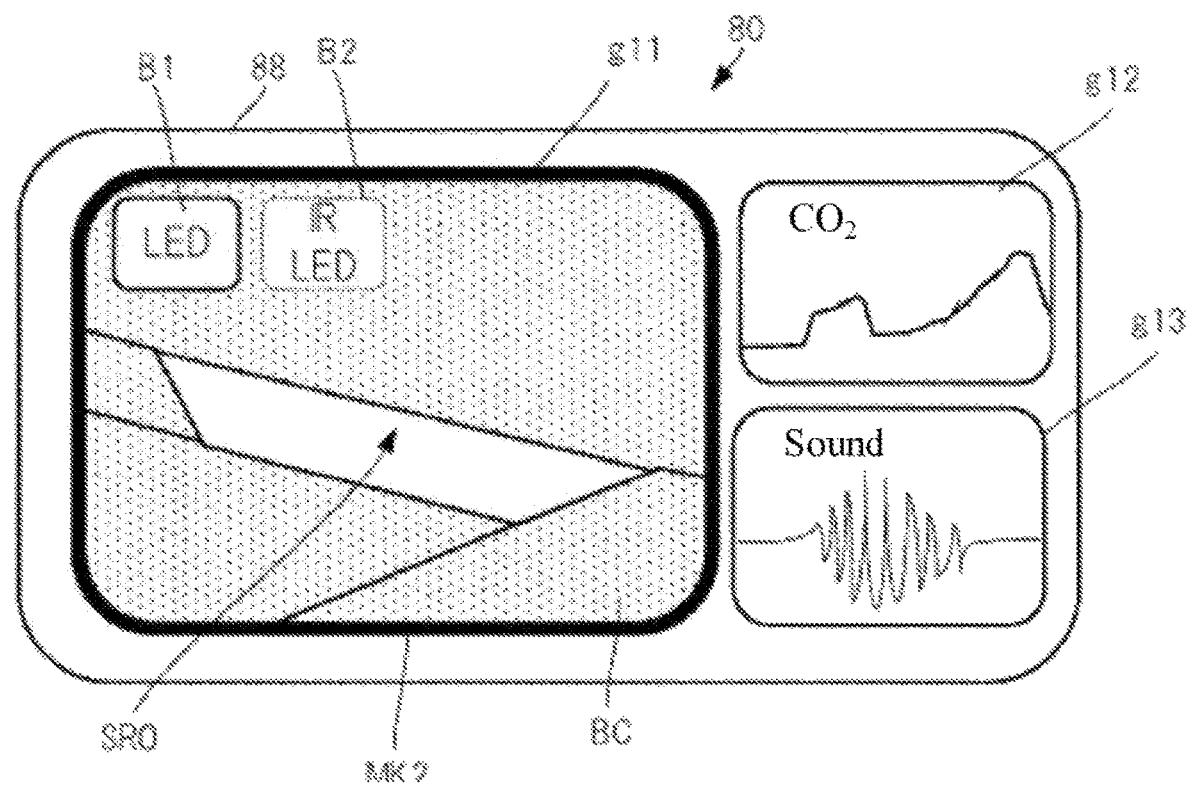
FIG. 20 illustrates a schematic diagram of another display example around obstacles displayed by a display unit.

FIG. 20 illustrates a schematic diagram of another display example around obstacles BC displayed by a display unit 88. The live view image g11 shown in FIG. 20 is an image captured by the camera unit 316 of the UAV 100 of FIG. 19, which, as compared to that shown in FIG. 18, may be closer to the investigation target SRO.

In FIG. 20, various sensors (for example, a carbon dioxide sensor 311, an image sensor 316a, and a microphone 317) included in the sensor unit 310 may be adjusted to face toward the investigation target SRO so that the sensor unit 310 (for example, the image sensor 316a of the camera unit 316) may be able to detect information related to the inside investigation target SRO surrounded by the obstacles BC. In this case, the angle of the second lever 206 with respect to the first gimbal 200 may be adjusted so that the second lever 206 is inserted into the gap of the obstacles BC toward the investigation target SRO. The angle of the second lever 206 may be adjusted by the UAV controller 110. In addition, the angle of the sensor unit 310 with respect to the second gimbal 202 may be adjusted so that the sensor unit 310 faces a desired direction. The angle of the sensor unit 310 can be adjusted by the UAV controller 110.

The state of FIG. 20 indicates the UAV 100 is closer to the investigation target SRO as compared to the state of FIG. 18. Therefore, the sensor condition is satisfied, and the status that the living body information is able to be detected by the sensor unit 310 may be maintained. Therefore, the display unit 88 may display the sensor-condition satisfaction sign MK2 together with the live view image g11.

In addition, in FIG. 20, the LED button B1 may be indicated by a solid line, that is, it may be in an on state. Therefore, the investigation target SRO may be illuminated by the visible-light LED 312. Therefore, even when the investigation target SRO is located inside the gap of the obstacles BC and the amount of light around the investigation target SRO is weak and dim, illumination may be achieved through the visible-light LED 312. Therefore, the UAV 100 may, for example, enhance the brightness and capture an image through the camera unit 316. Thus, it may be easy for the user to see the live view image g11 displayed on the display unit 88, and it may also be easy to visually confirm the status of the investigation target SRO.

In addition, in FIG. 20, the detection values of various sensors included in the sensor unit 310 may be displayed on the display unit 88. In the state of FIG. 20, the sensor condition may be satisfied, and data may be actually detected by various sensors included in the sensor unit 310. Therefore, the display unit 88 may display the detection values of various sensors and information based on the detection values. Thus, the user may be able to confirm the live view image g11 of the investigation target SRO illuminated with visible light and infrared light, and the detection values of various sensors (for example, the detection value of the carbon dioxide shown in the display area g12 and the detection value of the sound signal shown in the display area g13).

Figure 21:
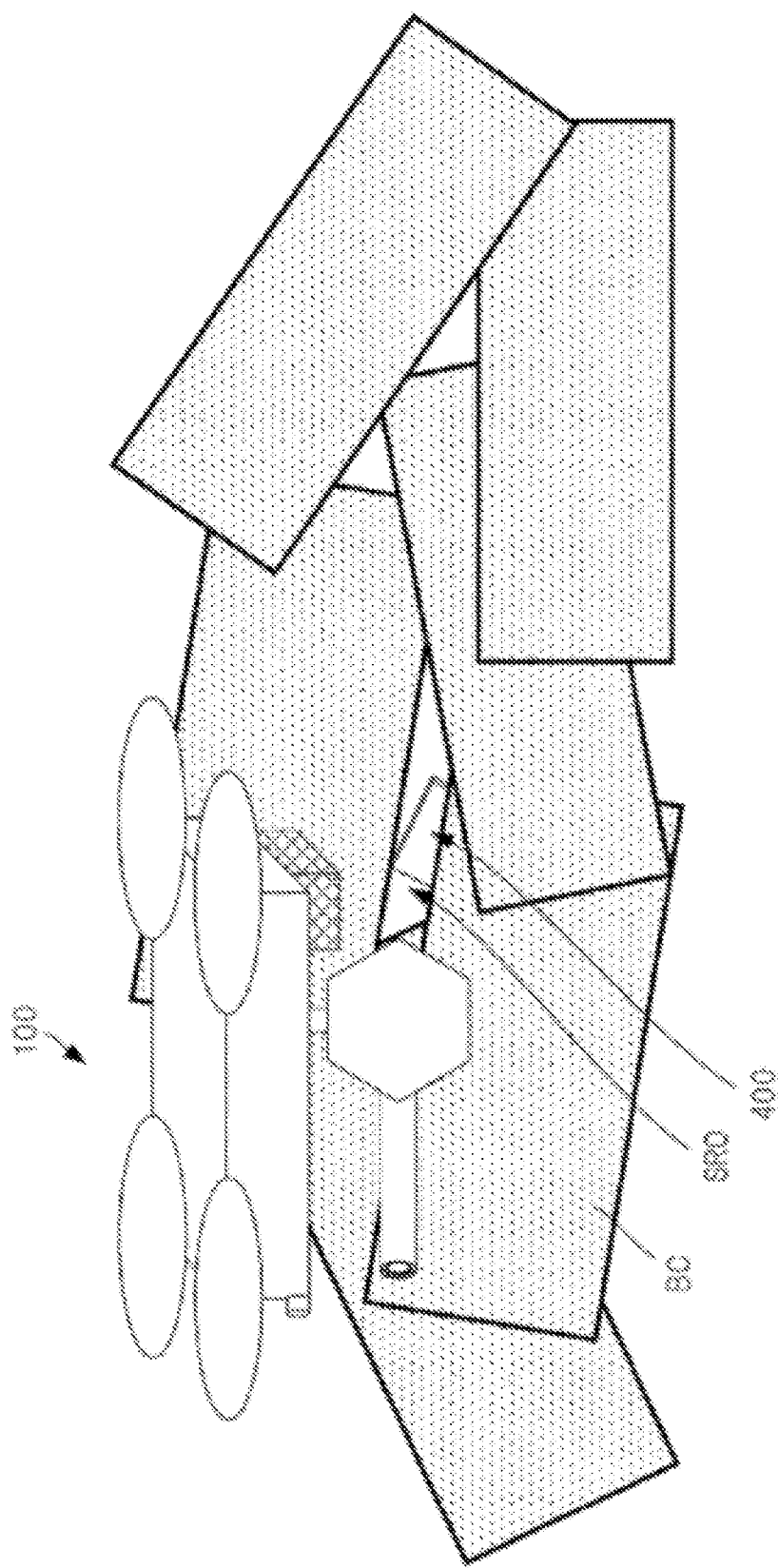
FIG. 21 illustrates a schematic diagram of a drop example of a transmitter by a UAV.

FIG. 21 illustrates a schematic diagram of a drop example of a transmitter 400 by a UAV 100. In FIG. 21, the transmitter 400 may be dropped from the receiving container 320 of the UAV 100 into the gap of the obstacles BC.

When it is determined that there is a living body as the investigation target, that is, when the obtained living body information is information indicating that a living body is present, the UAV controller 110 may drops a transmitter 400. For example, the UAV controller 110 may determine that a living body is present through image recognition of an image captured by the camera unit 316. When the carbon dioxide sensor 311 detects carbon dioxide above the threshold th1 which indicates the existence of the living body, the UAV controller 110 may determine that a living body is present. When a temperature of a living body (for example, a temperature of about 36 to 37° C.) is detected by the infrared sensor 315, the UAV controller 110 may determine that a living body is present. When a certain sound is detected through the microphone 317 or a predetermined sound (for example, a sound made by a human, or a sound of animal barking) is detected, the UAV controller 110 may determine that a living body is present.

When the detection result of the living body information measured by the sensor unit 310 is that it is determined that a living body is included in the investigation target SRO, the UAV controller 110 may take an image for the vicinity of the investigation target SRO through the camera 322. This camera image may be sent to the terminal 80 through the communication interface 150 and confirmed by the user. The UAV controller 110 may manually or automatically control the open/close unit 321 to open, so that the transmitter 400 may be dropped to the vicinity of the investigation target SRO, or into the gap of the obstacles BC where the investigation target SRO is located. That is, the controller of the sender 50 or the terminal controller 81 of the terminal 80 may input an instruction for dropping the transmitter 400 through an operation unit, and send the dropping-instruction information to the UAV 100 through the communication unit. In the UAV 100, the UAV controller 110 may drop the transmitter 400 according to the dropping-instruction information. For example, the open/close unit 321 may be opened in the vicinity of the investigation target SRO, or directly above the gap of the obstacles BC where the investigation target SRO is located. In addition, when it is difficult to drop the transmitter 400 into the gap of the obstacles BC where the investigation target SRO is located, the transmitter 400 may be dropped near the gap of the obstacles BC where the investigation target SRO is located.

In addition, the UAV controller 110 may lower the UAV 100 when the transmitter 400 is dropped, and may drop the transmitter 400 when the flying height of the transmitter 400 is below a threshold th4. As a result, it is possible to prevent the transmitter 400 from falling from a high place, thereby preventing the transmitter from being damaged or malfunctioning. The threshold value th4 may be, for example, 2 m. The threshold value th4 may be a fixed value or a variable value.

Figure 22:
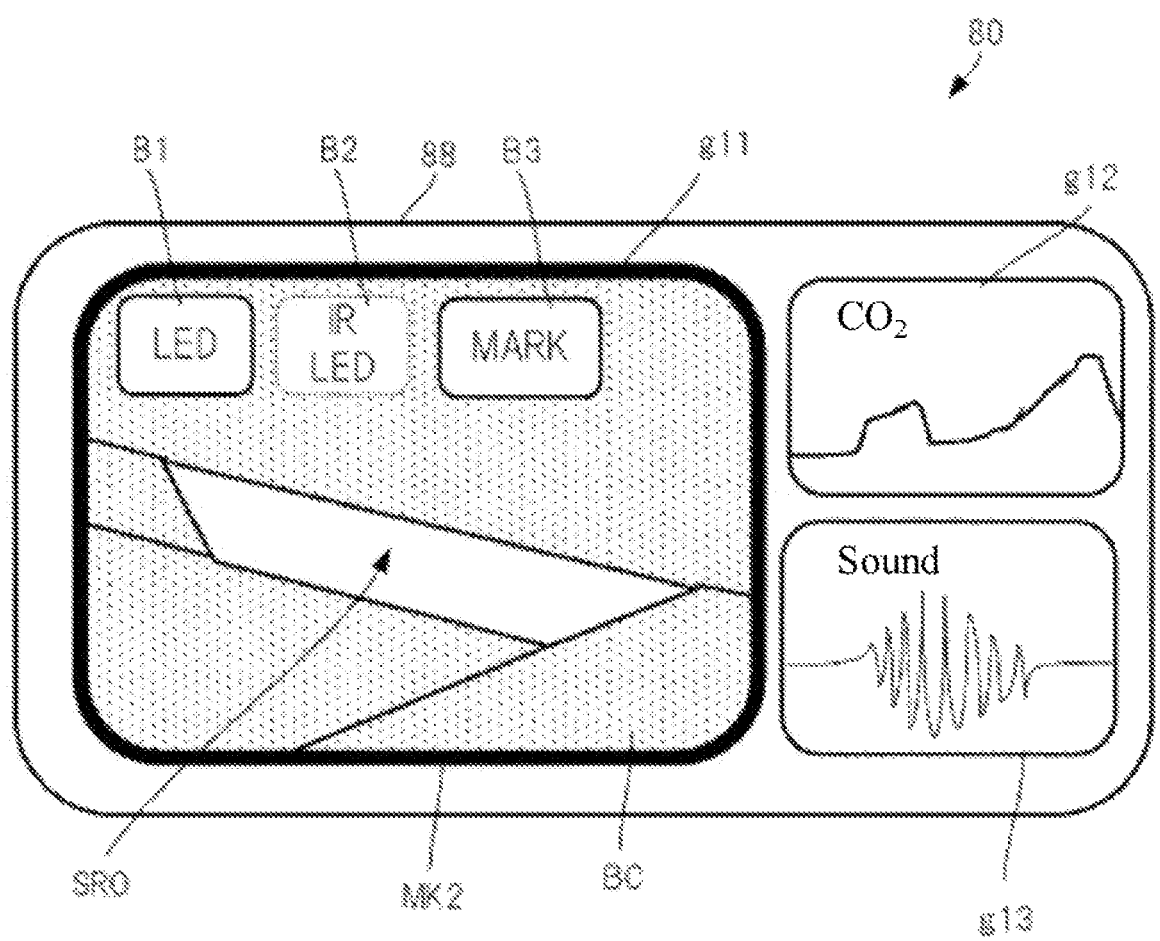
FIG. 22 illustrates a schematic diagram of a display example of a display unit when a transmitter is dropped by a UAV according to a drop example.

FIG. 22 illustrates a schematic diagram of a display example of a display unit 88 when a transmitter 400 is dropped by a UAV 100 according to a drop example.

In the area of the live view image g11 in the display unit 88, there is a MARK button B3 for opening and closing the open/close unit 321 of the receiving container 320. For example, the open state of the open/close unit 321 is indicated by a solid line, and the close state of the open/close unit 321 is indicated by a dotted line. In FIG. 22, the MARK button B3 is indicated by a solid line, indicating that the open/close unit 321 is opened.

In addition, when an input (for example, pressing) of the MARK button B3 through the operation unit 83 is detected, the terminal controller 81 may switch the open state and the closed state of the open/close unit 321. For example, the user may press the MARK button B3 at a desired position while watching the live view image g11 of the display unit 88 of the terminal 80 while instructing the flight control of the UAV 100 through the sender 50. Thereby, the UAV 100 may open the open/close unit 321 at the position desired by a user, and can drop the transmitter 400.

As such, the UAV 100 can mark the place where the living body is found by dropping a transmitter 400 in the vicinity of the investigation target SRO. Therefore, for example, after marking, when the user approaches the place where the living body is found, the user may be able to receive radio waves emitted from the transmitter 400 and may face the location of the living body. Therefore, compared to detecting a living body while the user is moving, the UAV 100 may be able to efficiently and safely search for living bodies.

In addition, the user may drop the transmitter 400 by pressing the MARK button B3 while confirming the status near the living body through the display unit 88. Therefore, the UAV 100 may drop the transmitter 400 at the timing and position desired by the user.

Figure 23:
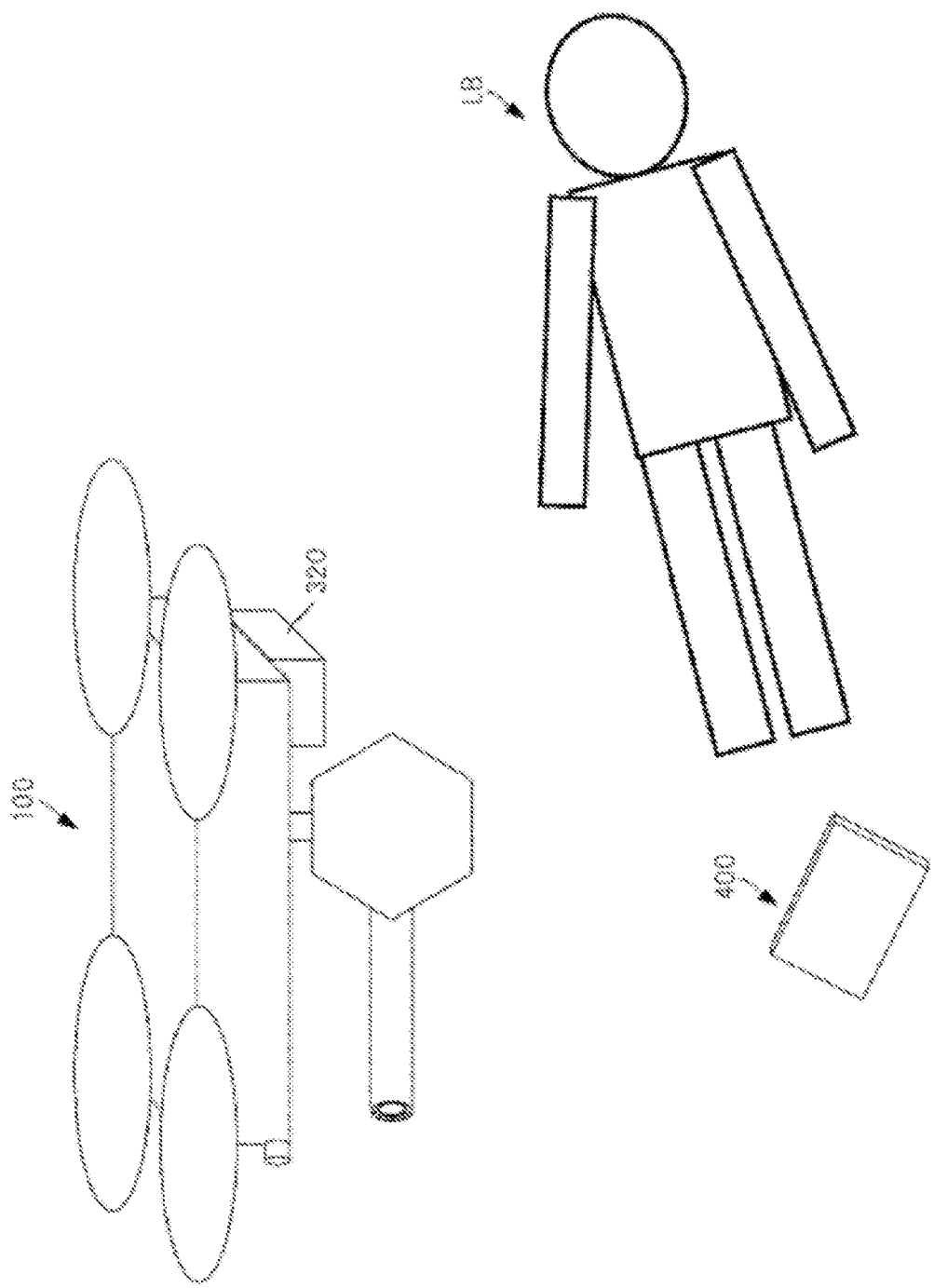
FIG. 23 illustrates a schematic diagram of another drop example of a transmitter by a UAV.

FIG. 23 illustrates a schematic diagram of another drop example of a transmitter 400 by a UAV 100. In FIG. 23, the transmitter 400 is dropped from the receiving container 320 of the UAV 100 to the vicinity of a person who is a living body LB.

In FIG. 23, there is no obstacle BC surrounding the living body LB, and the transmitter 400 can be easily dropped into the vicinity of the living body LB. The UAV controller 110 may, for example, manually or automatically control the open/close unit 321 to drop the transmitter 400 to the vicinity of the living body LB. In this case, the UAV controller 110 may be able to drop the transmitter 400 away from the position of the living body LB.

Figure 24:
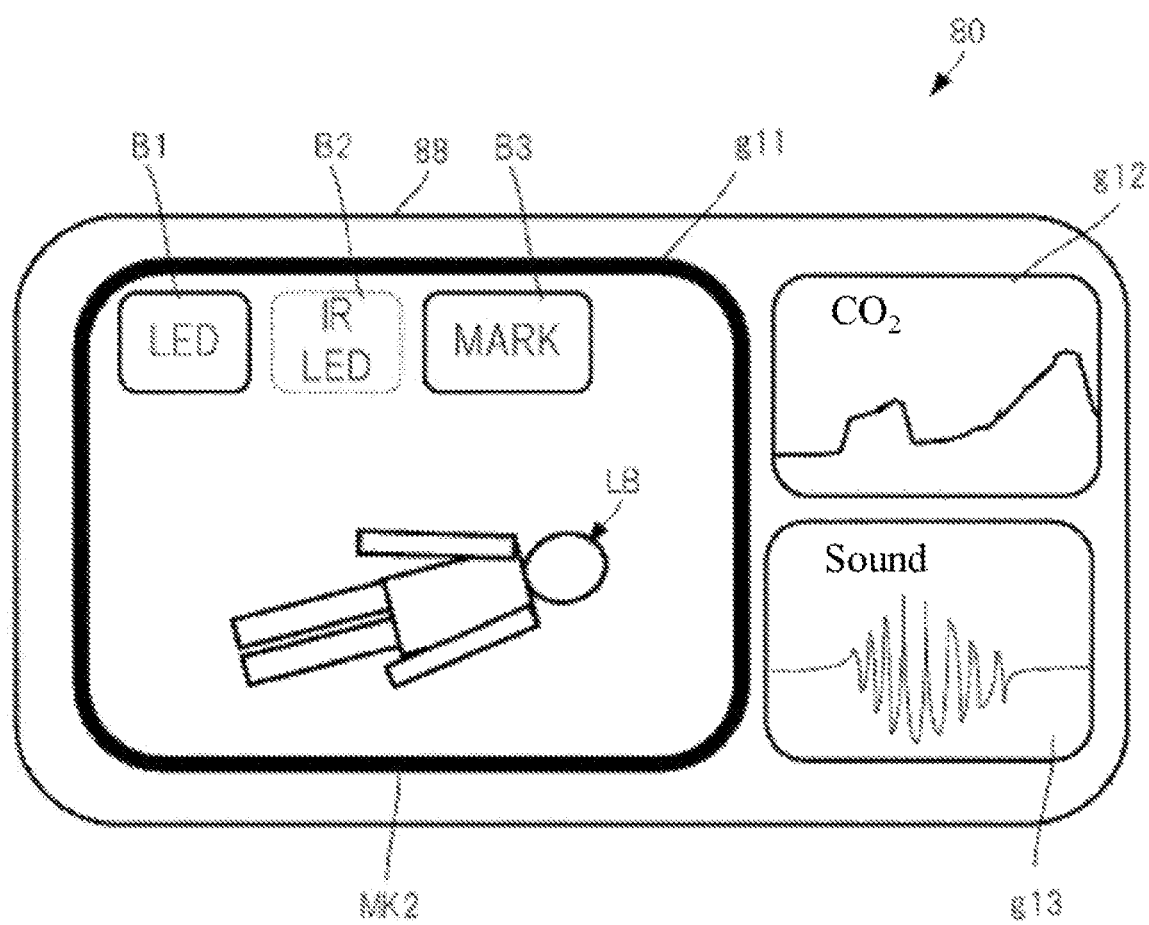
FIG. 24 illustrates a schematic diagram of a display example of a display unit when a transmitter is dropped by a UAV according to a drop example.

FIG. 24 illustrates a schematic diagram of a display example of a display unit 88 when a transmitter 400 is dropped by a UAV 100 according to a drop example. In FIG. 24, since there are no obstacles BC around the living body LB, the living body LB may be easily displayed in the live view image g11.

As such, the sensor unit 310 may be able to recognize (for example, observe and determine) the living body LB to be investigated even when not being inserted into the gap of the obstacles BC. The UAV 100 may not need to drop the transmitter 400 into the gap of the obstacles BC, the transmitter 400 may be dropped to the vicinity of the living body LB. In this case, the position of the living body LB may also be marked.

Next, a specific method for the UAV 100 approaching the investigation target SRO in consideration of the obstacles BC will be described. In this situation, the UAV 100 may be assumed to have a case of moving left and right (that is, moving in a horizontal direction other than the traveling direction, i.e. the forward direction) in order to avoid the obstacles BC, and a case of no need to move left and right to avoid the obstacles BC.

FIG. 25A illustrates a schematic diagram of an example of a position relationship between a UAV 100 and an obstacle BC when left/right movement is not required. FIG. 25B illustrates a schematic diagram of an example of a position relationship between the UAV100 and the obstacle BC when the UAV 100 approaches the investigation target from the state shown in FIG. 25A. FIG. 25A and FIG. 25B may be views of the UAV 100 and the obstacle BC viewed from below.

In FIG. 25A, the investigation target SRO is at the front (to the top in FIG. 25A). In addition, there is no obstacle BC between the camera unit 316 included in the UAV 100 and the investigation target SRO. That is, the obstacle BC may not exist on a straight line connecting the camera unit 316 included in the UAV 100 and the investigation target SRO. Therefore, the UAV 100 may reach the investigation target SRO by moving directly forward.

In FIG. 25B, since the UAV 100 moves from the state of FIG. 25A to the front (the top side in FIG. 25A), the measurement distance to the obstacle BC measured by the first ultrasonic sensor 280 may be the reference length d0, which indicates that the sensor condition is satisfied. In this case, the sensor-condition satisfaction sign MK2 may be displayed together with the live view image g11. This measurement distance is the distance from the rotor 211 in front of the UAV 100 to the obstacle BC (entry position p1), and may become the reference length d0.

In the position shown in FIG. 25B, the UAV controller 110 of the UAV 100 may extend the second lever 206 and detect living body information in an investigation target SRO through the sensor unit 310. The living body information may include information indicating that a living body is present, and information indicating that no living body is present.

In this case, the UAV controller 110 may obtain extension-instruction information for the second lever 206 to extend, and make the second lever 206 extended according to the extension-instruction information. The UAV controller 110 may extend the second lever 206 automatically or manually.

When the second lever 206 is manually extended, the controller of the sender 50 or the terminal controller 81 of the terminal 80 may input an instruction for extending the second lever 206 through an operation unit, and send extension-instruction information to the UAV 100 through a communication unit. In the UAV 100, the UAV controller 110 may extend the second lever 206 according to the extension-instruction information.

When the second lever 206 is automatically extended, the UAV controller 110 may, when the sensor condition is satisfied at the current position of the UAV 100, and there is no obstacle BC in the extended position of the second lever 206 (the position that the second lever 206 reaches when the second lever 206 is extended), make the second lever 206 extend. Whether or not there is an obstacle BC in the extended position of the second lever 206 can be determined using, for example, image recognition of an image captured by the camera unit 316 at the current position of the UAV 100. In FIG. 25B, there is no obstacle BC in the extended position of the second lever 206.

Therefore, when reaching a predetermined position for detecting living body information, the UAV 100 may be able to extend the second lever 206 to detect the living body information by the sensor unit 310 provided on the front end side of the second lever 206. In addition, before the predetermined position for detecting living information is reached, by maintaining the second lever 206 in a retracted state, the overall size of the second lever 206 including the UAV 100 may become smaller, making it unlikely for the UAV 100 to collide with an obstacle BC in the vicinity of the investigation target SRO. Therefore, the UAV 100 may be easy to move, and damage to the UAV 100 due to a collision may also be avoided.

In addition, by manually extending the second lever 206, the user may, while confirming the status of the vicinity of the investigation target SRO on the display unit 88, press a lever extension button (not shown) for instructing the extension of the second lever 206 to make the second lever 206 extend. Therefore, the UAV 100 may be able to extend the second lever 206 at the timing and position desired by the user.

Figure 26D:
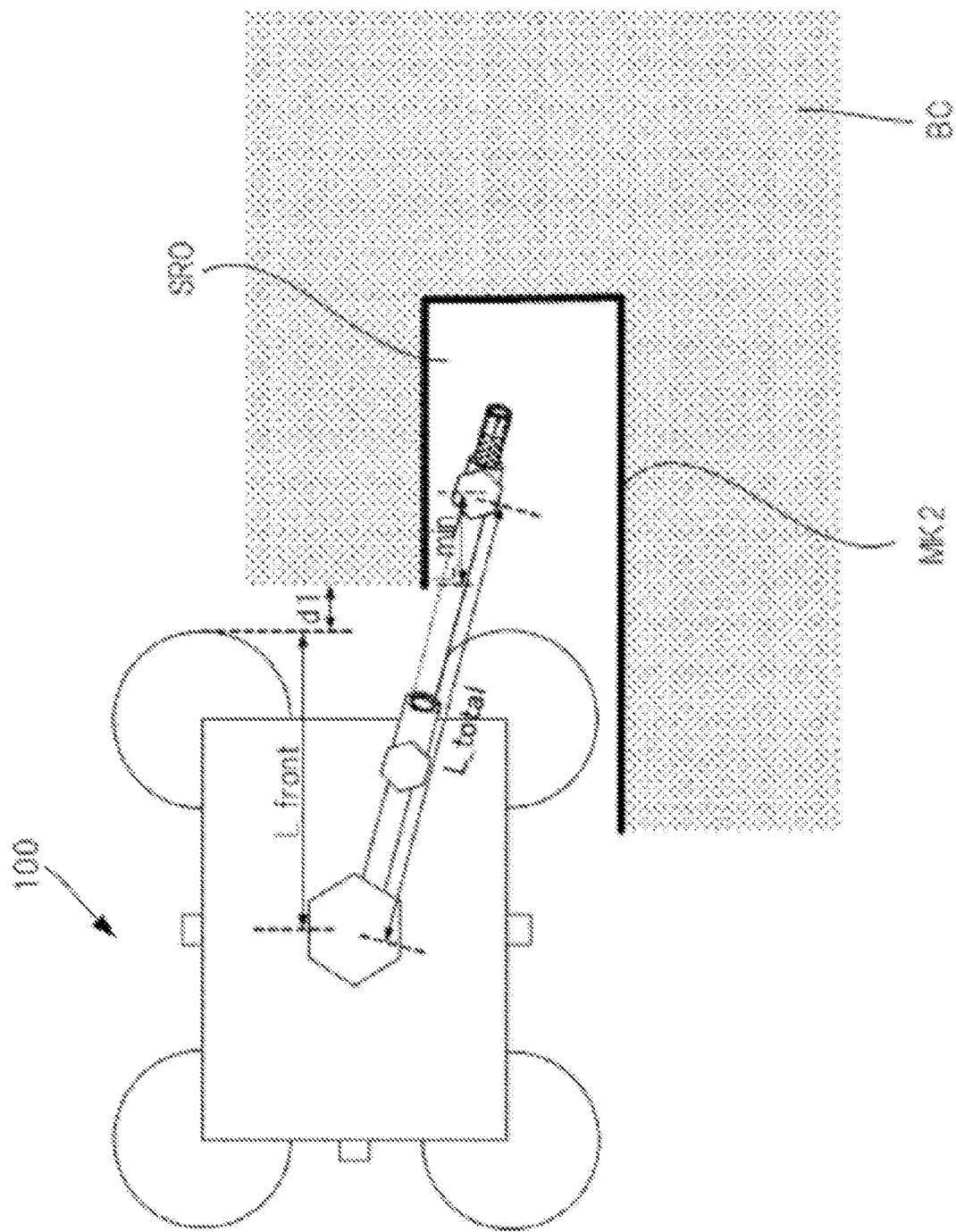
FIG. 26D illustrates a schematic diagram for explaining a case where living body information is detected by a sensor unit.

FIG. 26A illustrates a schematic diagram of an example of a position relationship between a UAV 100 and an obstacle BC when left/right movement is required. FIG. 26B illustrates a schematic diagram explaining a case where a UAV 100 moves away from an obstacle BC. FIG. 26C illustrates a schematic diagram for explaining a case where an orientation of a second lever 206 is changed. FIG. 26D illustrates a schematic diagram for explaining a case where the sensor unit 310 performs sensing measurements. FIG. 26A to FIG. 26D are views of the UAV 100 and the obstacle BC viewed from below.

In FIG. 26A, the investigation target SRO is at the front (to the top in FIG. 26A).

On the other hand, there is an obstacle BC existing between the camera unit 316 included in the UAV 100 and the investigation target SRO. That is, an obstacle BC may exist on a straight line connecting the camera unit 316 included in the UAV 100 and the investigation target SRO. Therefore, when the UAV 100 directly moves forward, the rotor 211 and the like may come into contact with the obstacle BC.

In this case, the UAV controller 110 may acquire movement-instruction information for moving the UAV 100, and move the UAV 100 according to the movement-instruction information. The UAV controller 110 may be moved automatically or manually.

When the UAV 100 is moved manually, the controller of the sender 50 or the terminal controller 81 of the terminal 80 may input an instruction for moving the UAV 100 through an operation unit, and send the movement-instruction information to the UAV 100 through a communication unit. In the UAV 100, the UAV controller 110 may extend the UAV 100 according to the movement-instruction information.

When the UAV 100 is moved automatically, when the sensor condition is not satisfied, the UAV controller 110 may make the UAV 100 to move away to avoid the obstacle BC. Moving the UAV 100 to avoid the obstacle BC may use image recognition of an image captured by the camera unit 316 at the current position of the UAV 100 to measure the position and distance of the obstacle BC and to make adjustment in order to avoid the obstacle BC.

Therefore, even when the vicinity of the investigation target SRO is covered by an obstacle BC on the flight forward path of the UAV 100, the UAV 100 may be able to change the flight forward path to an arbitrary direction and approach the investigation target SRO while avoiding the obstacle BC. Therefore, the UAV 100 may be able to approach the status where the sensor unit 310 is able to detect living body information, may be able to find living bodies, and have a high probability of success in rescue.

In addition, by manually moving the UAV 100, the user may be able to confirm the situation in the vicinity of the investigation target SRO on the display unit 88, and move the UAV 100 away to avoid the obstacle BC while flying. Therefore, the UAV 100 may be able to move the UAV 100 in consideration of the timing and position desired by the user.

In FIG. 26B, the UAV 100 may move from the state of FIG. 26A to the front left (upper left in FIG. 26B), indicating that the sensor condition is satisfied. In this case, the sensor-condition satisfaction sign MK2 may be displayed together with the live view image g1. That is, it indicates that it is not necessary to further move the UAV 100 in order to detect the living body information through the sensor unit 310.

In FIG. 26B, when the second lever 206 is extended without changing the orientation of the second lever 206, the obstacle BC located in front of the second lever 206 will be hit. In addition, there is no investigation target SRO on the extension line along the direction in which the second lever 206 extends. Therefore, the UAV controller 110 may change the orientation of the second lever 206 in the horizontal direction so as to face the direction of the investigation target SRO.

In this case, the UAV controller 110 may acquire orientation-instruction information for changing the orientation of the second lever 206, and change the orientation of the second lever 206 based on the orientation-instruction information. The UAV controller 110 may change the orientation of the second lever 206 automatically or manually.

When the orientation of the second lever 206 is manually changed, the controller of the sender 50 or the terminal controller 81 of the terminal 80 may input an instruction for changing the orientation of the second lever 206 through an operation unit, and send the orientation-instruction information to the UAV 100 through a communication unit. In the UAV 100, the UAV controller 110 may control the first gimbal 200 to change the orientation of the second lever 206 according to the orientation-instruction information.

When the orientation of the second lever 206 is automatically changed, the UAV controller 110 may, when the sensor condition is satisfied at the current position of the UAV 100, and there is an obstacle BC in the extended position of the second lever 206, control the first gimbal 200 to change the orientation of the second lever 206. In FIG. 26B, an obstacle BC is present at the extended position of the second lever 206.

Therefore, by changing the orientation of the second lever 206 in the UAV 100, even when, for example, there is an obstacle BC in the forward direction of the UAV 100, the sensor unit 310 may be moved into the gap of the obstacles without moving the UAV 100 to make the sensor unit approach the investigation target SRO. In addition, after the UAV 100 is moved to a desired position, the UAV 100 may be able finely adjust the positional relationship between the UAV 100 and the investigation target SRO by changing the orientation of the second lever 206. As such, the UAV 100 may be able to improve the possibility of detecting living body information through the sensor unit 310.

In addition, by manually changing the orientation of the second lever 206, the user may be able to adjust the orientation of the second lever 206 while observing the vicinity of the obstacles BC and the investigation target SRO on the display unit 88, so that the obstacle BC may be avoided when entering the gap of the obstacles BC. Therefore, the UAV 100 may be able to change the orientation of the second lever 206 in consideration of the timing and position desired by the user.

In FIG. 26C, the UAV controller 110 may not need to change the position of the UAV 100 from the position in FIG. 26B, but adjust the angle at which the first gimbal 200 supports the second lever 206, and change the orientation of the second lever 206 to right front (upper right in FIG. 26C). Thus, the UAV 100 may be able to prevent the second lever 206 from colliding with the obstacle BC when the second lever 206 is extended. In addition, the second lever 206 may be extended toward the investigation target SRO.

In addition, in FIG. 26C, the distance from the forward end portion of the UAV 100 (the front end of the forward rotor 211) to the obstacle BC facing the UAV 100 may be consistent with the reference length d0. Here, in FIG. 26C, as the orientation of the second lever 206 changes, the reference length d0 may be changed to the reference length d1. The reference length d1 may be shorter than the reference length d0. In order to satisfy the sensor condition, it is necessary to be shorter than the reference length d1. Therefore, in FIG. 26C, the sensor condition may not be satisfied.

That is, considering the length L3 when the second lever 206 is extended to the maximum, the starting point of the length L3 (the end point on the rotor 211 side) may be located closer to the front side (the UAV 100 side) than the entry position p1 of the obstacle BC. Therefore, in order to be able to perform the sensing measurement by the sensor unit 310, the UAV 100 may need to be further advanced.

In FIG. 26D, the UAV 100 may advance toward the facing obstacle BC compared to the state of FIG. 26C, and the distance between the front end of the UAV 100 and the obstacle BC may become the reference length dl. In this case, the sensor condition may be satisfied, and the sensor-condition satisfaction sign MK2 may be displayed together with the live view image g1. That is, it may indicate that at the position of the UAV 100 shown in FIG. 26D, the living body information may be detected through the sensor unit 310.

As such, when an investigation target SRO is present at the front and the UAV 100 needs to move left and right (movement other than horizontal forward-backward movement) to avoid the obstacle BC, the UAV controller 110 may control the flight of the UAV 100 manually or automatically as described above 100 to move the position of the UAV 100. In addition, the UAV controller 110 may control the first gimbal 200, and control the sensor unit 310 so as to face the investigation target SRO. In this case, for example, the imaging direction of the camera unit 316 may become the direction of the investigation target SRO.

In addition, when the first gimbal 200 is controlled to adjust the orientation of the second lever 206, the UAV controller 110 may recalculate the reference length d that changes according to the angle of the second lever 206, and may display or may not display the sensor-condition satisfaction sign MK2 with the live view image g11 based on the recalculation result.

Next, details of the reference lengths d (d1, d2) will be described.

The UAV controller 110 may calculate a reference length d for determining whether or not a sensor condition is satisfied. The UAV controller 110 may control the first gimbal 200 and calculate the reference length d again when the orientation of the second lever 206 with respect to the first gimbal 200 is changed.

For example, the reference length d0 shown in FIGS. 25B, 26B, and 26C can be expressed by the following (Equation 1).

$$d0 = L1 - L2 - L3 \quad \text{(Equation 1)}$$

Figure 27:
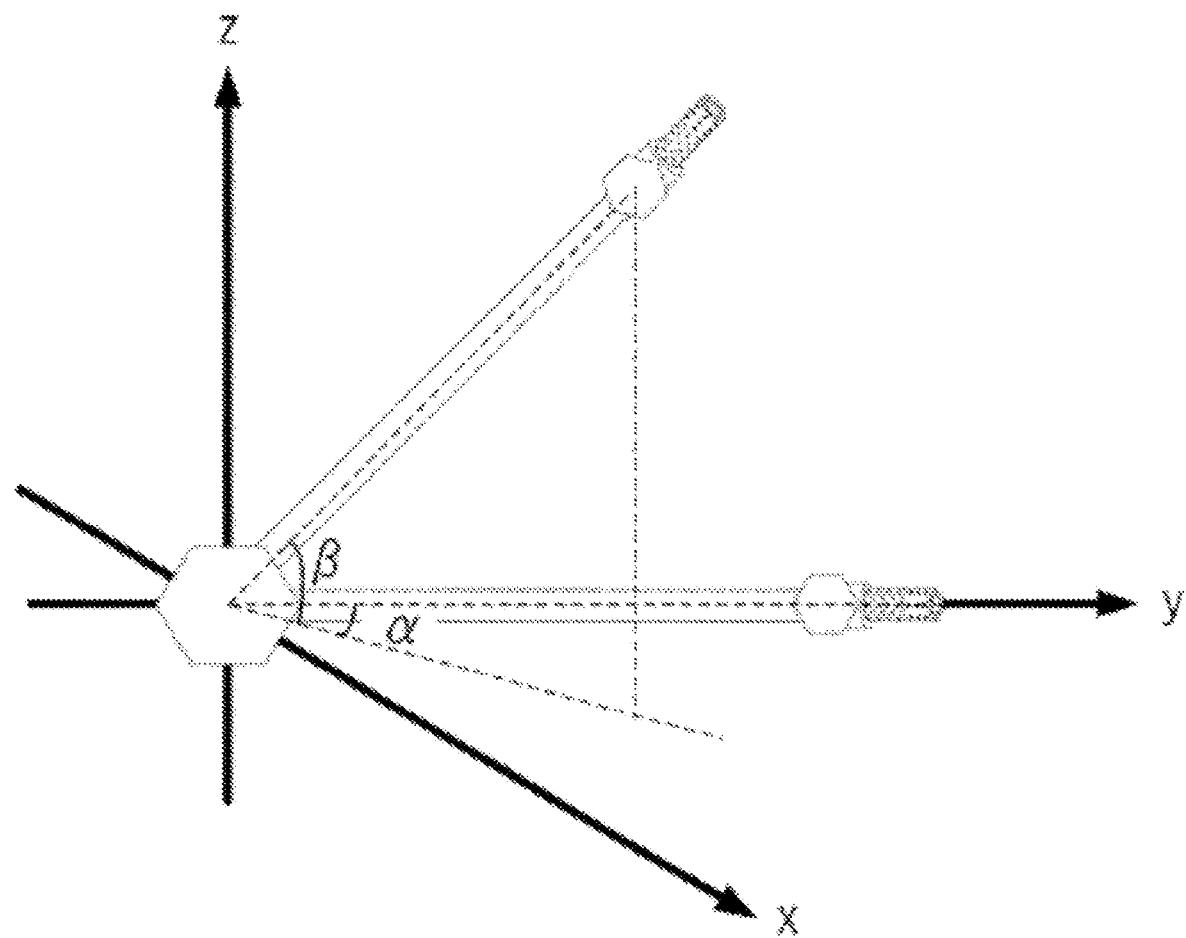
FIG. 27 illustrates a schematic diagram for explaining a reference length that takes into consideration the orientation of a second lever with respect to a first gimbal.

FIG. 27 illustrates a schematic diagram for explaining a reference length dl that takes into consideration the orientation of the second lever 206 with respect to the first gimbal 200.

For example, the distance dl between the UAV 100 and the obstacle BC after changing the orientation of the second lever 206 with respect to the first gimbal 200 shown in FIG. 26C may be expressed by the following (Equation 2).

$$D1 = L1' - L2 - L3 \quad \text{(Equation 1)}$$

In addition, $L1' = L1 \times \cos\alpha \times \cos\beta$.

In addition, a may be an angle formed by the extending direction of the second lever 206 and the y-axis (equivalent to the pitch axis). β may be an angle formed by the extending direction of the second lever 206 and the z-axis (equivalent to the yaw axis).

That is, the angle α may represent, for example, a horizontal component (horizontal angle) of the angle of the extension direction of the second lever 206 with respect to the reference direction of the second lever 206 shown in FIG. 27 (here, the direction along the y-axis). β may represent, for example, a vertical direction component (vertical angle) of the angle of the extension direction of the second lever 206 with respect to the reference direction of the second lever 206 shown in FIG. 27. As such, when the direction in which the second lever 206 extends is changed from the reference direction, the reach range reached when the second lever 206 is extended may become shorter. On the other hand, even when the orientation of the second lever 206 changes, the reference direction (for example, the forward direction) of the UAV 100 may not change. Therefore, instead of changing the direction of the reference length d with the reference direction of the UAV 100, it may be implemented as the effective range in which the sensing measurement can be performed is shortened (becoming a near side), and the reference length d is shortened.

Next, the operation of the living body detection system 10 will be described.

Figure 28:
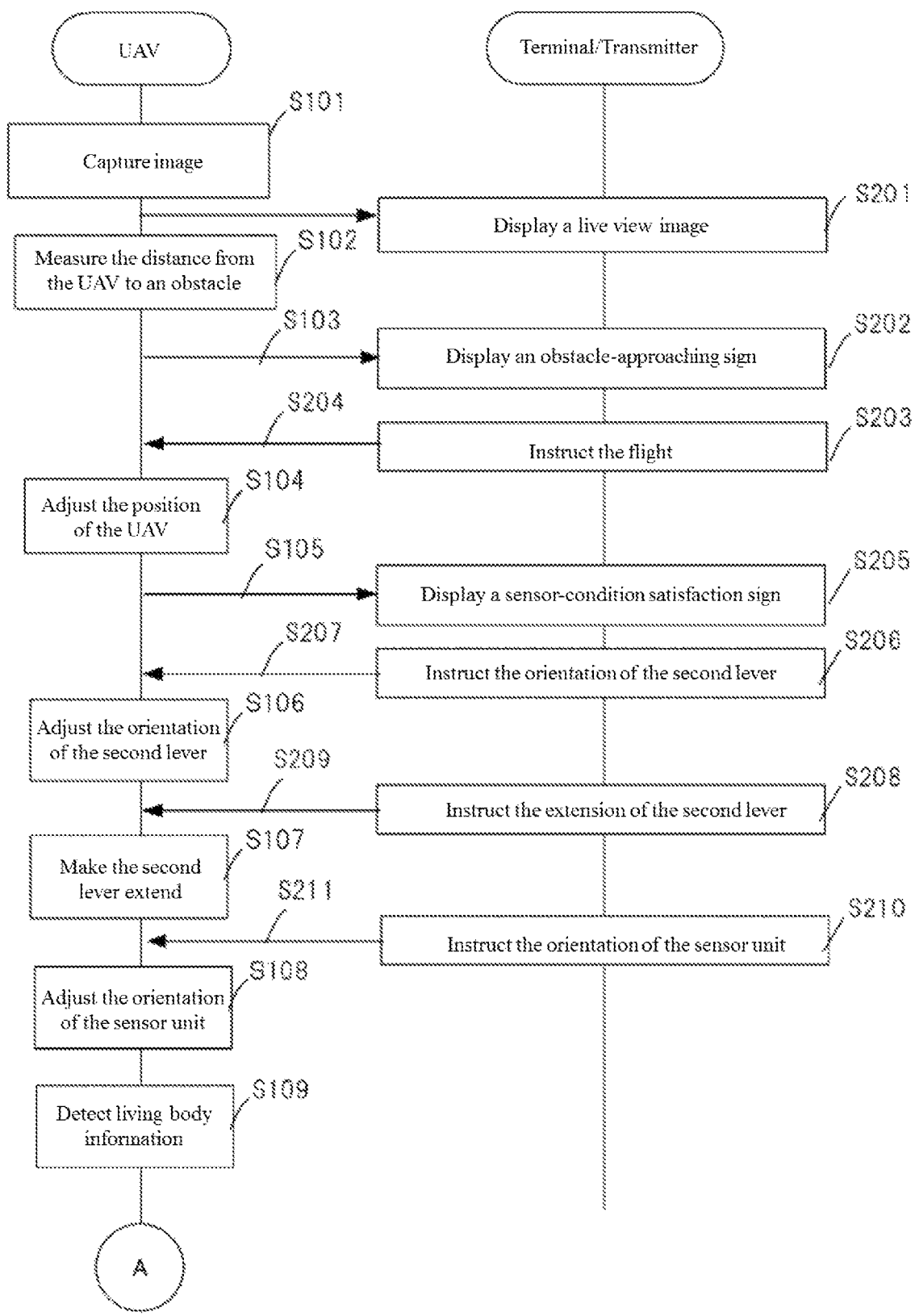
FIG. 28 illustrates a sequence diagram of an operation example of a living body detection system.
Figure 29:
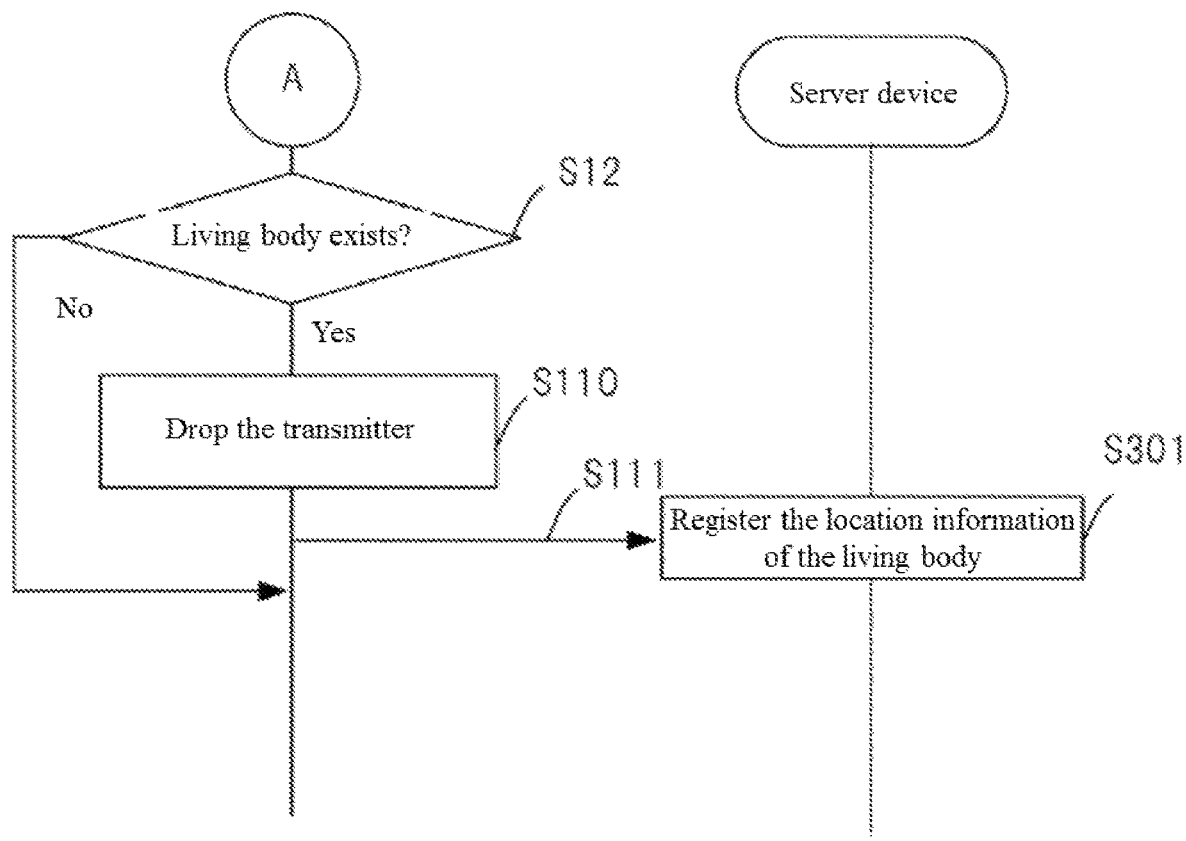
FIG. 29 illustrates a sequence diagram of operation examples of a living body detection system (continued from FIG. 28).

FIGS. 28-29 illustrate a sequence diagram of an operation example of a living body detection system 10. Here, it is assumed that the power of various sensors included in the sensor unit 310 is turned on and the various sensors can operate.

In a UAV 100, a UAV controller 110 may make a camera unit 316 capture an image in a search area SR1, and may send the captured aerial photography image to a terminal 80 through a communication interface 150 (S101). In the terminal 80, a terminal controller 81 may receive the aerial photography image through a communication unit 85, and may display the aerial photography image as a live view image g11 on a display unit 88 (S201).

The user may confirm the live view image g11 on the screen of the display unit 88 and operate a sender 50 to bring the UAV 100 close to an investigation target SRO. The sender 50 may send flight-instruction information based on a user operation to the UAV 100. In the UAV 100, the UAV controller 110 may control the flight of the UAV 100 according to the flight-instruction information received through the communication interface 150. In addition, the UAV controller 110 may control a first gimbal 200 to make a second lever 206 face a reference direction, and control the UAV 100 to face the forward direction (for example, the direction along the y-axis of FIG. 27).

The UAV controller 110 may control the UAV 100 to approach the investigation target SRO located inside a gap of obstacles BC. The UAV controller 110 may measure (detect) a distance from the obstacles BC existing in the vicinity of the investigation target SRO by a first ultrasonic sensor 280 (S102).

When the measurement distance is smaller than a safety distance (less than the safety distance), the UAV controller 110 may notify the terminal 80 of this situation through the communication interface 150 (S103). In the terminal 80, the terminal controller 81 may receive this situation through the communication unit 85, and display the obstacle-approaching sign MK1 on the display unit 88 (S202). In addition, the display manner of the obstacle-approaching sign MK1 may be changed according to the measurement distance.

The user may refer to the obstacle-approaching sign MK1 displayed on the display unit 88, and operate the sender 50 to instruct the UAV 100 to prevent the UAV 100 from colliding with the obstacle BC (S203). The sender 50 may send flight-instruction information based on a user operation to the UAV 100 (S204). In the UAV 100, the UAV controller 110 may control the flight of the UAV 100 based on the flight-instruction information received through the communication interface 150, and may adjust the position of the UAV 100 (S104).

When the measurement distance of the first ultrasonic sensor 280 becomes shorter than a threshold value th3 as the UAV 100 flies in the forward direction, the UAV controller 110 may satisfy the sensor condition at this flight position. In this case, the UAV controller 110 may notify the terminal 80 that the sensor condition is satisfied through the communication interface 150 (an example of the second notification information) (S105). In the terminal 80, the terminal controller 81 may receive the condition that the sensor condition is satisfied through the communication unit 85, and display the sensor-condition satisfaction sign MK2 on the display unit 88 (S205).

The user may input an instruction to control the angle of the first gimbal 200 and adjust the orientation of the second lever 206 through an operating unit of the sender 50 or an operation unit 83 of the terminal 80 (S206). The controller of the sender 50 or the terminal controller 81 may receive the user operation, and send orientation-instruction information of the second lever 206 to the UAV 100 through the communication unit 85 or the like (S207). In the UAV 100, the UAV controller 110 may receive the orientation-instruction information through the communication interface 150, and change the orientation of the second lever 206 according to the orientation-instruction information (S106).

When the angle of the second lever 206 with respect to the first gimbal 200 is adjusted, the reference length d0 becomes shorter, and the sensor condition is not satisfied, the UAV controller 110 may display this situation. In this case, the UAV controller 110 may send the condition that the sensor condition is not satisfied to the terminal 80 through the communication interface 150. In the terminal 80, the terminal controller 81 may receive the condition that the sensor condition is not satisfied through the communication unit 85, and release the display (stop display) of the sensor-condition satisfaction sign MK2 of the display unit 88. As such, the user may be able to recognize that the sensor condition is not satisfied. In this case, for example, the UAV controller 110 may move the UAV 100 forward manually or automatically to adjust in order to satisfy the sensor condition.

For example, when it is confirmed that the sensor condition is satisfied by displaying the sensor-condition satisfaction sign MK2, the user may input an instruction to extend the second lever 206 through the operation unit of the sender 50 or the operation unit 83 of the terminal 80 (S208). The controller of the sender 50 or the terminal controller 81 may receive a user operation, and send the extension-instruction information of the second lever 206 to the UAV 100 through the communication unit 85 or the like (S209). In the UAV 100, the UAV controller 110 may receive the extension-instruction information through the communication interface 150, and make the second lever 206 extend according to the extension-instruction information (S107).

When confirming the extension of the second lever 206, the user may control a second gimbal 202 through the operation unit of the sender 50 or the operation unit 83 of the terminal 80, and input an instruction for making the orientation of the sensor unit 310 toward the investigation target SRO (S210). The controller of the sender 50 or the terminal controller 81 may receive the user operation, and send the orientation-instruction information of the sensor unit 310 to the UAV 100 through the communication unit 85 or the like (S211). In the UAV 100, the UAV controller 110 may receive the orientation-instruction information through the communication interface 150, and change the orientation of the sensor unit 310 according to the orientation-instruction information (S108).

The UAV controller 110 may make various sensors included in the sensor unit 310 that approach the investigation target SRO and face the investigation target SRO detect living body information (S109). The living body information may be information detected by the sensor unit 310 and including data related to the investigation target. The UAV controller 110 may determine the presence or absence of a living body based on the detected living body information (S110).

When it is determined that a living body (for example, a survivor) is present, the UAV controller 110 may open an open/close unit 321 of a receiving container 320 containing a transmitter 400 and drop the transmitter 400 (S111).

In addition, when it is determined that a living body is present, the UAV controller 110 may acquire the position information of the UAV 100 through a GPS receiver 240. The UAV controller 110 may send this position information of the UAV 100 to a server device 40 through the communication interface 150. The UAV controller 110 may acquire the position information of the UAV 100 through the communication interface 150. The UAV controller 110 may send the living body information detected by the sensor unit 310 and the image captured by the camera unit 316 or the camera unit 230 to the server device 40 together with the position information of the UAV 100 through the communication interface 150. The image captured by the camera unit 316 may be an image in which a living body is imaged.

According to the UAV 100 and the living body detection system 10, in addition to using various cameras and various gimbals for living body detection, the living body detection is also performed using various sensors of the sensor unit 310, such that the presence or absence of a living body can be visually determined, and information other than vision may also be used to determine the presence or absence of a living body. Therefore, for example, the UAV 100 and the living body detection system 10 may be able to improve rescue efficiency and save rescue time. In addition, even in a case where a person is buried under rubble or snow due to an earthquake or avalanche, the UAV 100 and the living body detection system 10 may be able to detect living bodies while reducing the risk of the user when detecting the living bodies.

Next, management of living body information and sender information by a server device 40 will be described.

In the server device 40, a server controller 41 may acquire the position information of the living body from the UAV 100 through a communication unit 45. The server controller 41 may acquire the living body information from the UAV 100 through the communication unit 45 and an image captured by the camera unit 316 or the camera unit 230. The server controller 41 may store the acquired position information, living body information, images, etc. in the memory 49.

The memory 49 may store living body information and information related to the transmitter 400 (transmitter information). The transmitter information may be information of the transmitter 400 dropped in the past or to be dropped in the future. For example, the memory 49 may store identification information of the transmitter 400, position information (position information of the UAV 100) to which the transmitter 400 is dropped, and living body information. The position information on which the transmitter 400 is dropped may be consistent with the position information of the living body. The memory 49 may store the image captured by the UAV 100 together with the living body information and the transmitter information. This aerial photography image may be an image of a living body included in the investigation target SRO.

The server controller 41 may acquire information (position information of the living body, living body information, images, etc.) stored in the memory 49 and display the information on an external monitor. The server controller 41 may send information (position information of the living body, living body information, images, etc.) stored in the memory 49 to the terminal 80 and the like through the communication section 45.

The server controller 41 may acquire map data stored in the memory 49. The server controller 41 may acquire map data from an external server through the communication section 45. The server controller 41 may superimpose the position information of the living body acquired from the UAV 100 on the map data. The map data on which the position information of the living body is superimposed may be displayed on an external monitor or may be sent to the terminal 80.

As described above, by sending and storing the position information and/or other information of the living body in the server device 40, the position information and/or other information of the living body, as collected in the center of the server device 40, can be checked up together. Therefore, for example, a user departing from the center may be able to directly go to the location where the living body is located. In addition, the server device 40 may cooperate with the terminal 80 hold by the user, so that the user may be able to confirm the position information of the living body and the information of the transmitter near the rescue site.

As such, the rescue staff at the disaster relief center may be able to confirm the location of the living body by referring to an external monitor. In addition, a rescuer traveling to a search area SR1 may be able to refer to the display unit 88 of the terminal 80 to confirm the location of the living body. In addition, the user may be able to acquire the living body information together with the position information, and can grasp what kind of living body exists at each position where the living body exists.

In addition, when approaching the vicinity of a living body, the user may be able to receive, through the terminal 80, radio waves of the transmitter 400 that is dropped to the vicinity of the living body. Therefore, compared to the case where there are many obstacles BC and detection of living bodies is clueless, the living body detection system 10 may greatly improve the detection efficiency and rescue efficiency of living bodies.

The present embodiment shows an example in which the UAV 100 performs processing related to living body detection, but it is not limited to this. For example, the processing unit of the sender 50 and the terminal controller 81 of the terminal 80 may perform at least a part of the processing related to living body detection described in this embodiment. Accordingly, it is possible to reduce the processing load of the UAV 100 when performing processing related to living body detection, thereby realizing the load distribution.

In this embodiment, the terminal 80 supporting the living body detection of the UAV 100 (the terminal that instructs the control of the UAV 100) and the terminal 80 held by a rescuer who actually performs the detection of living bodes may be the same terminal, or may be different terminals.

The present disclosure has been described through the embodiments, but the technical scope of the present disclosure is not limited to the scope described in the above embodiments. It should be apparent to those skilled in the art that various changes or improvements can be made to the above embodiments. From the description of the claims, it should also be understood that the embodiments added with such changes or improvements should be included in the technical scope of the present disclosure.

The execution order of the processes, such as actions, sequences, steps, and stages in devices, systems, programs, and methods shown in the claims, the description, and the drawings attached to the description, as long as "before" "in advance" and so on, as long as the output of the previous processing is not used in the subsequent processing, it can be implemented in any order. The operation flow in the claims, the description, and the drawings of the present disclosure has been described using "first", "next", etc. for convenience, but it does not mean that the operations must be performed in this order.

What is claimed is:

1. A flying body, for detecting a living body, comprising:
a sensor unit, that detects living body information related to the living body;
a support component, that supports the sensor unit and is retractable;
a gimbal, that rotatably supports the support component;
a processing unit configured to perform processing related to detection of the living body information; and
a camera unit, that captures images;
wherein: the processing unit is configured to: control the camera unit to capture an image of an investigation area, control flight of the flying body such that the flying body approaches the investigation area, control the support component to extend, to extend the sensor unit to an investigation target located in the investigation area, and control the sensor unit to detect the living body information.

2. The flying body according to claim 1, wherein:
the processing unit is further configured to, when information that indicates existence of the living body is detected as the living body information, acquire location information of the flying body and send the location information of the flying body to a server device.

3. The flying body according to claim 2, further including a receiving container for receiving a transmitter that emits radio waves, wherein:
the processing unit is further configured to, when information that indicates existence of the living body is detected as the living body information, control the transmitter to drop down from the receiving container.

4. The flying body according to claim 3, wherein:
the processing unit is further configured to acquire dropping-instruction information for dropping the transmitter from a controller that instructs control of the flying body, and control the transmitter to drop down according to the dropping-instruction information.

5. The flying body according to claim 1, wherein:
the processing unit is further configured to, at a current position of the flying body, when a sensor condition is satisfied, and there is no obstacle in an extended position of the support component, control the support component to extend, the sensor condition indicating that the living body information is able to be detected by the sensor unit when the support component is extended.

6. The flying body according to claim 5, wherein:
the processing unit is further configured to acquire extension-instruction information for instructing extension of the support component from a controller that instructs control of the flying body, and control the support component to extend according to the extension-instruction information.

7. The flying body according to claim 1, wherein:
the processing unit is further configured to, when a sensor condition is not satisfied, move the flying body away to avoid an obstacle, the sensor condition indicating that the living body information is able to be detected by the sensor unit when the support component is extended.

8. The flying body according to claim 7, wherein:
the processing unit is further configured to acquire movement-instruction information for instructing movement of the flying body from a controller that instructs control of the flying body, and move the flying body away to avoid the obstacle according to the movement-instruction information.

9. The flying body according to claim 1, wherein:
the processing unit is further configured to, at a current position of the flying body, when a sensor condition is satisfied, and there is an obstacle in the extended position of the support component, control the gimbal to change an orientation of the support component, the sensor condition indicating that the living body information is able to be detected by the sensor unit when the support component is extended.

10. The flying body according to claim 9, wherein:
the processing unit is further configured to acquire orientation-instruction information for instructing the orientation of the support component from a controller that instructs control of the flying body, and change the orientation of the support component according to the orientation-instruction information.

11. A living body detection method, of a flying body, which includes a sensor unit for detecting living body information related to a living body, a support component that supports the sensor unit and is retractable, and a gimbal for rotatably supporting the support component, and detecting the living body, the method comprising:
controlling a camera unit to capture an image of an investigation area;
controlling flight of the flying body such that the flying body approaches the investigation area;
controlling the support component to extend, to extend the sensor unit to an investigation target located in the investigation area; and
controlling the sensor unit to detect the living body information.

12. The living body detection method according to claim 11, further including:
acquiring location information of the flying body when information that indicates existence of the living body is detected as the living body information; and
sending the location information of the flying body to a server device.

13. The living body detection method according to claim 11, wherein:
the flying body includes a receiving container for receiving a transmitter that emits radio waves, and
the method further includes:
when the information that indicates the existence of the living body is detected as the living body information, controlling the transmitter to drop down from the receiving container.

14. The living body detection method according to claim 13, further including:
acquiring dropping-instruction information for dropping the transmitter from a controller that instructs control of the flying body, wherein:
controlling the transmitter to drop down includes controlling the transmitter to drop down according to the dropping-instruction information.

15. The living body detection method according to claim 11, wherein:
controlling the support component to extend includes:
at a current position of the flying body, when a sensor condition is satisfied, and there is no obstacle in an extended position of the support component, controlling the support component to extend, the sensor condition indicating that the living body information is able to be detected by the sensor unit when the support component is extended.

16. The living body detection method according to claim 15, further including:
acquiring extension-instruction information for instructing extension of the support component from a controller that instructs control of the flying body, wherein:
controlling the support component to extend includes controlling the support component to extend according to the extension-instruction information.

17. The living body detection method according to claim 11, wherein:
controlling the flight of the flying body includes;
when a sensor condition is not satisfied, moving the flying body away to avoid an obstacle, the sensor condition indicating that the living body information is able to be detected by the sensor unit when the support component is extended.

18. The living body detection method according to claim 17, further including:
acquiring movement-instruction information for instructing movement of the flying body from a controller that instructs control of the flying body, wherein:
controlling the flight of the flying body includes moving the flying body away to avoid the obstacle according to the movement-instruction information.

19. The living body detection method according to claim 11, further including:
at a current position of the flying body, when a sensor condition is satisfied, and there is an obstacle in the extended position of the support component, controlling the gimbal to change an orientation of the support component, the sensor condition indicating that the living body information is able to be detected by the sensor unit when the support component is extended.

20. The living body detection method according to claim 11, wherein:
the sensor unit includes a plurality of sensors, and
the method further includes:
acquiring switch-instruction information for turning on or off at least one sensor included in the sensor unit from a controller that instructs control of the flying body, and
turning on or off the at least one sensor included in the sensor unit according to the switch-instruction information.

* * * * *